(12) United States Patent
Hsu et al.

(10) Patent No.: US 7,516,399 B2
(45) Date of Patent: Apr. 7, 2009

(54) STRUCTURED-DOCUMENT PATH-LANGUAGE EXPRESSION METHODS AND SYSTEMS

(75) Inventors: Bofan Hsu, Redmond, WA (US); Sarah Sosiak, Seattle, WA (US); Shiraz J. Cupala, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 657 days.

(21) Appl. No.: 10/955,087

(22) Filed: Sep. 30, 2004

(65) Prior Publication Data

US 2006/0074930 A1     Apr. 6, 2006

(51) Int. Cl.
G06F 17/00 (2006.01)
(52) U.S. Cl. ....................... 715/234; 715/713
(58) Field of Classification Search .............. 715/513, 715/505, 234, 200, 231, 237, 254, 713; 702/179, 702/17; 717/143; 707/102, 100
See application file for complete search history.

(56) References Cited

U.S. PATENT DOCUMENTS

| | | | |
|---|---|---|---|
| 4,201,978 A | 5/1980 | Nally | |
| 4,498,147 A | 2/1985 | Agnew et al. | |
| 4,514,800 A | 4/1985 | Gruner et al. | |
| 4,564,752 A | 1/1986 | Lepic et al. | |
| 4,641,274 A | 2/1987 | Swank | |
| 4,674,040 A | 6/1987 | Barker et al. | |
| 4,723,211 A | 2/1988 | Barker et al. | |
| 4,739,477 A | 4/1988 | Barker et al. | |
| 4,815,029 A | 3/1989 | Barker et al. | |
| 4,847,749 A | 7/1989 | Collins et al. | |
| 4,910,663 A | 3/1990 | Bailey | |
| 4,933,880 A | 6/1990 | Borgendal et al. | |
| 4,962,475 A | 10/1990 | Hernandez et al. | |
| 5,025,484 A | 6/1991 | Yamanari et al. | |
| 5,072,412 A | 12/1991 | Henderson, Jr. et al. | |
| 5,179,703 A | 1/1993 | Evans | |
| 5,182,709 A | 1/1993 | Makus | |
| 5,187,786 A | 2/1993 | Densmore et al. | |
| 5,191,645 A | 3/1993 | Carlucci et al. | |
| 5,195,183 A | 3/1993 | Miller et al. | |
| 5,204,947 A | 4/1993 | Bernstein et al. | |

(Continued)

FOREIGN PATENT DOCUMENTS

EP     0841615     11/1999

(Continued)

OTHER PUBLICATIONS

XmlSpy, XmlSpy 2004 Enterprise Edition Manual, May 17, 2004, Altova, pp. 1-25 & 220-225.*

(Continued)

*Primary Examiner*—Stephen S Hong
*Assistant Examiner*—Manglesh M Patel

(57) ABSTRACT

Systems and methods for building and/or simplifying structured-document path-language expressions are described. One of these systems or methods enables a user to graphically select structured-document path-language functions and addresses. With these addresses and functions, a structured-document path-language expression can be built without a user having to fully understand or type in syntax for the expression. Another of these systems or methods simplifies structured-document path-language address and function syntax. This simplification can aid a user in building and easily understanding a structured-document path-language expression.

36 Claims, 7 Drawing Sheets

U.S. PATENT DOCUMENTS

| | | |
|---|---|---|
| 5,206,951 A | 4/1993 | Khoyi et al. |
| 5,218,672 A | 6/1993 | Morgan et al. |
| 5,220,649 A | 6/1993 | Forcier |
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffeman et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A | 1/1999 | Morris et al. |
| 5,862,379 A | 1/1999 | Rubin et al. |
| 5,864,819 A | 1/1999 | De Armas et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,922,072 A | 7/1999 | Hutchinson et al. |
| 5,928,363 A | 7/1999 | Ruvolo |
| 5,929,858 A | 7/1999 | Shibata et al. |
| 5,940,075 A | 8/1999 | Mutschler, III et al. |
| 5,950,010 A | 9/1999 | Hesse et al. |
| 5,956,481 A | 9/1999 | Walsh et al. |
| 5,960,199 A | 9/1999 | Brodsky et al. |
| 5,963,964 A | 10/1999 | Nielsen |
| 5,973,696 A | 10/1999 | Agranat et al. |
| 5,974,454 A | 10/1999 | Apfel et al. |
| 5,982,370 A | 11/1999 | Kamper |
| 5,983,348 A | 11/1999 | Ji |
| 5,987,480 A | 11/1999 | Donohue et al. |
| 5,991,710 A | 11/1999 | Papineni et al. |
| 5,991,731 A | 11/1999 | Colon et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,014,135 A | 1/2000 | Fernandes |
| 6,016,520 A | 1/2000 | Facq et al. |
| 6,018,743 A | 1/2000 | Xu |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,044,205 A | 3/2000 | Reed et al. |
| 6,052,531 A | 4/2000 | Waldin et al. |
| 6,052,710 A | 4/2000 | Saliba et al. |
| 6,054,987 A | 4/2000 | Richardson |
| 6,070,184 A | 5/2000 | Blount et al. |
| 6,072,870 A | 6/2000 | Nguyen et al. |
| 6,078,326 A | 6/2000 | Kilmer et al. |
| 6,078,327 A | 6/2000 | Liman et al. |
| 6,078,924 A | 6/2000 | Ainsbury et al. |

| | | | | | | |
|---|---|---|---|---|---|---|
| 6,081,610 | A | 6/2000 | Dwork et al. | 6,381,742 B2 | 4/2002 | Forbes et al. |
| 6,084,585 | A | 7/2000 | Kraft et al. | 6,381,743 B1 | 4/2002 | Mutschler, III |
| 6,088,708 | A | 7/2000 | Burch et al. | 6,389,434 B1 | 5/2002 | Rivette et al. |
| 6,091,417 | A | 7/2000 | Lefkowitz | 6,393,456 B1 | 5/2002 | Ambler et al. |
| 6,094,657 | A | 7/2000 | Hailpern et al. | 6,396,488 B1 | 5/2002 | Simmons et al. |
| 6,097,382 | A | 8/2000 | Rosen et al. | 6,405,221 B1 | 6/2002 | Levine et al. |
| 6,098,081 | A | 8/2000 | Heidorn et al. | 6,405,238 B1 | 6/2002 | Votipka |
| 6,108,637 | A | 8/2000 | Blumenau | 6,408,311 B1 | 6/2002 | Baisley et al. |
| 6,108,783 | A | 8/2000 | Krawczyk et al. | 6,414,700 B1 | 7/2002 | Kurtenbach et al. |
| 6,115,646 | A | 9/2000 | Fiszman et al. | 6,421,070 B1 | 7/2002 | Ramos et al. |
| 6,121,965 | A | 9/2000 | Kenney et al. | 6,421,656 B1 | 7/2002 | Cheng et al. |
| 6,122,647 | A | 9/2000 | Horowitz et al. | 6,425,125 B1 | 7/2002 | Fries et al. |
| 6,144,969 | A | 11/2000 | Inokuchi et al. | 6,429,885 B1 | 8/2002 | Saib et al. |
| 6,151,624 | A | 11/2000 | Teare et al. | 6,434,563 B1 | 8/2002 | Pasquali et al. |
| 6,154,128 | A | 11/2000 | Wookey et al. | 6,434,564 B2 | 8/2002 | Ebert |
| 6,163,772 | A | 12/2000 | Kramer et al. | 6,442,563 B1 | 8/2002 | Bacon et al. |
| 6,167,521 | A | 12/2000 | Smith et al. | 6,442,755 B1 | 8/2002 | Lemmons et al. |
| 6,167,523 | A | 12/2000 | Strong | 6,446,110 B1 | 9/2002 | Lection et al. |
| 6,182,094 | B1 | 1/2001 | Humpleman et al. | 6,449,617 B1 | 9/2002 | Quinn et al. |
| 6,182,095 | B1 | 1/2001 | Leymaster et al. | 6,457,009 B1 | 9/2002 | Bollay |
| 6,188,401 | B1 | 2/2001 | Peyer | 6,460,058 B2 | 10/2002 | Koppolu et al. |
| 6,191,797 | B1 | 2/2001 | Politis | 6,463,419 B1 | 10/2002 | Kluss |
| 6,192,367 | B1 | 2/2001 | Hawley et al. | 6,470,349 B1 | 10/2002 | Heninger et al. |
| 6,195,661 | B1 | 2/2001 | Filepp et al. | 6,473,800 B1 | 10/2002 | Jerger et al. |
| 6,199,204 | B1 | 3/2001 | Donohue | 6,476,828 B1 | 11/2002 | Burkett et al. |
| 6,209,128 | B1 | 3/2001 | Gerard et al. | 6,476,833 B1 | 11/2002 | Moshfeghi |
| 6,216,152 | B1 | 4/2001 | Wong et al. | 6,477,544 B1 | 11/2002 | Bolosky et al. |
| 6,219,698 | B1 | 4/2001 | Iannucci et al. | 6,480,860 B1 | 11/2002 | Monday |
| 6,225,996 | B1 | 5/2001 | Gibb et al. | 6,487,566 B1 | 11/2002 | Sundaresan |
| 6,235,027 | B1 | 5/2001 | Herzon | 6,490,601 B1 | 12/2002 | Markus et al. |
| 6,253,366 | B1 | 6/2001 | Mutschler, III | 6,493,702 B1 | 12/2002 | Adar et al. |
| 6,253,374 | B1 | 6/2001 | Dresevic et al. | 6,501,864 B1 | 12/2002 | Eguchi et al. |
| 6,263,313 | B1 | 7/2001 | Milsted et al. | 6,502,101 B1 | 12/2002 | Verprauskus et al. |
| 6,266,810 | B1 | 7/2001 | Tanaka et al. | 6,502,103 B1 | 12/2002 | Frey et al. |
| 6,268,852 | B1 | 7/2001 | Lindhorst et al. | 6,505,200 B1 | 1/2003 | Ims et al. |
| 6,272,506 | B1 | 8/2001 | Bell | 6,505,230 B1 | 1/2003 | Mohan et al. |
| 6,275,227 | B1 | 8/2001 | DeStefano | 6,505,300 B2 | 1/2003 | Chan et al. |
| 6,275,599 | B1 | 8/2001 | Adler et al. | 6,507,856 B1 | 1/2003 | Chen et al. |
| 6,279,042 | B1 | 8/2001 | Ouchi | 6,516,322 B1 | 2/2003 | Meredith |
| 6,281,896 | B1 | 8/2001 | Alimpich et al. | 6,519,617 B1 | 2/2003 | Wanderski et al. |
| 6,282,711 | B1 | 8/2001 | Halpern et al. | RE38,070 E | 4/2003 | Spies et al. |
| 6,286,033 | B1 | 9/2001 | Kishinsky et al. | 6,546,546 B1 | 4/2003 | Van Doorn et al. |
| 6,292,897 | B1 | 9/2001 | Gennaro et al. | 6,549,221 B1 | 4/2003 | Brown et al. |
| 6,297,819 | B1 | 10/2001 | Furst | 6,549,878 B1 | 4/2003 | Lowry et al. |
| 6,300,948 | B1 | 10/2001 | Geller et al. | 6,549,922 B1 | 4/2003 | Srivastava et al. |
| 6,307,955 | B1 | 10/2001 | Zank et al. | 6,553,402 B1 | 4/2003 | Makarios et al. |
| 6,308,179 | B1 | 10/2001 | Petersen et al. | 6,560,616 B1 | 5/2003 | Garber |
| 6,308,273 | B1 | 10/2001 | Goertzel et al. | 6,560,620 B1 | 5/2003 | Ching |
| 6,311,271 | B1 | 10/2001 | Gennaro et al. | 6,560,640 B2 | 5/2003 | Smethers |
| 6,314,415 | B1 | 11/2001 | Mukherjee | 6,563,514 B1 | 5/2003 | Samar |
| 6,321,259 | B1 | 11/2001 | Ouellette et al. | 6,571,253 B1 | 5/2003 | Thompson et al. |
| 6,321,334 | B1 | 11/2001 | Jerger et al. | 6,578,144 B1 | 6/2003 | Gennaro et al. |
| 6,327,628 | B1 | 12/2001 | Anuff et al. | 6,581,061 B2 | 6/2003 | Graham |
| 6,331,864 | B1 | 12/2001 | Coco et al. | 6,584,469 B1 | 6/2003 | Chiang et al. |
| 6,342,907 | B1 | 1/2002 | Petty et al. | 6,584,548 B1 | 6/2003 | Bourne et al. |
| 6,343,149 | B1 | 1/2002 | Motoiwa | 6,585,778 B1 | 7/2003 | Hind et al. |
| 6,343,302 | B1 | 1/2002 | Graham | 6,589,290 B1 | 7/2003 | Maxwell et al. |
| 6,345,256 | B1 | 2/2002 | Milsted et al. | 6,594,686 B1 | 7/2003 | Edwards et al. |
| 6,345,278 | B1 | 2/2002 | Hitchcock et al. | 6,598,219 B1 | 7/2003 | Lau |
| 6,345,361 | B1 | 2/2002 | Jerger et al. | 6,603,489 B1 | 8/2003 | Edlund et al. |
| 6,347,323 | B1 | 2/2002 | Garber et al. | 6,604,099 B1 | 8/2003 | Chung et al. |
| 6,349,408 | B1 | 2/2002 | Smith | 6,606,606 B2 | 8/2003 | Starr |
| 6,351,574 | B1 | 2/2002 | Yair et al. | 6,609,200 B2 | 8/2003 | Anderson et al. |
| 6,353,851 | B1 | 3/2002 | Anupam et al. | 6,611,822 B1 | 8/2003 | Beams et al. |
| 6,353,926 | B1 | 3/2002 | Parthesarathy et al. | 6,611,840 B1 | 8/2003 | Baer et al. |
| 6,356,906 | B1 | 3/2002 | Lippert et al. | 6,611,843 B1 | 8/2003 | Jacobs |
| 6,357,038 | B1 | 3/2002 | Scouten | 6,613,098 B1 | 9/2003 | Sorge et al. |
| 6,366,907 | B1 | 4/2002 | Fanning et al. | 6,615,276 B1 | 9/2003 | Mastrianni et al. |
| 6,366,912 | B1 | 4/2002 | Wallent et al. | 6,629,109 B1 | 9/2003 | Koshisaka |
| 6,367,013 | B1 | 4/2002 | Bisbee et al. | 6,631,357 B1 | 10/2003 | Perkowski |
| 6,369,840 | B1 | 4/2002 | Barnett et al. | 6,631,379 B2 | 10/2003 | Cox |
| 6,369,841 | B1 | 4/2002 | Salomon et al. | 6,631,497 B1 | 10/2003 | Jamshidi et al. |
| 6,374,402 | B1 | 4/2002 | Schmeidler et al. | 6,631,519 B1 | 10/2003 | Nicholson et al. |

| | | | | | |
|---|---|---|---|---|---|
| 6,632,251 B1 | 10/2003 | Rutten et al. | 7,002,560 B2 | 2/2006 | Graham |
| 6,635,089 B1 | 10/2003 | Burkett et al. | 7,003,722 B2 | 2/2006 | Rothchiller et al. |
| 6,636,845 B2 | 10/2003 | Chau et al. | 7,010,580 B1 | 3/2006 | Fu et al. |
| 6,643,633 B2 | 11/2003 | Chau et al. | 7,020,869 B2 | 3/2006 | Abriari et al. |
| 6,643,652 B2 | 11/2003 | Helgeson et al. | 7,024,417 B1 | 4/2006 | Russakovsky et al. |
| 6,643,684 B1 | 11/2003 | Malkin et al. | 7,032,170 B2 | 4/2006 | Poulose |
| 6,651,217 B1 | 11/2003 | Kennedy et al. | 7,036,072 B1 | 4/2006 | Sulistio et al. |
| 6,654,737 B1 | 11/2003 | Nunez | 7,039,875 B2 | 5/2006 | Khalfay et al. |
| 6,654,932 B1 | 11/2003 | Bahrs et al. | 7,051,273 B1 | 5/2006 | Holt et al. |
| 6,658,417 B1 | 12/2003 | Stakutis et al. | 7,058,663 B2 | 6/2006 | Johnston et al. |
| 6,658,622 B1 | 12/2003 | Aiken et al. | 7,062,764 B2 | 6/2006 | Cohen et al. |
| 6,661,920 B1 | 12/2003 | Skinner | 7,065,493 B1 | 6/2006 | Homsi |
| 6,668,369 B1 | 12/2003 | Krebs et al. | 7,080,083 B2 | 7/2006 | Kim et al. |
| 6,671,805 B1 | 12/2003 | Brown et al. | 7,080,325 B2 | 7/2006 | Treibach-Heck et al. |
| 6,675,202 B1 | 1/2004 | Perttunen | 7,086,009 B2 | 8/2006 | Resnick et al. |
| 6,678,717 B1 | 1/2004 | Schneider | 7,086,042 B2 * | 8/2006 | Abe et al. .................. 717/143 |
| 6,681,370 B2 | 1/2004 | Gounares et al. | 7,088,374 B2 | 8/2006 | David et al. |
| 6,691,230 B1 | 2/2004 | Bardon | 7,100,147 B2 | 8/2006 | Miller et al. |
| 6,691,281 B1 | 2/2004 | Sorge et al. | 7,103,611 B2 | 9/2006 | Murthy et al. |
| 6,697,944 B1 | 2/2004 | Jones et al. | 7,106,888 B1 | 9/2006 | Silverbrook et al. |
| 6,701,434 B1 | 3/2004 | Rohatgi | 7,107,282 B1 | 9/2006 | Yalmanchi |
| 6,701,486 B1 | 3/2004 | Weber et al. | 7,107,521 B2 | 9/2006 | Santos |
| 6,704,906 B1 | 3/2004 | Yankovich et al. | 7,120,863 B1 | 10/2006 | Wang |
| 6,711,679 B1 | 3/2004 | Guski et al. | 7,130,885 B2 | 10/2006 | Chandra et al. |
| 6,720,985 B1 | 4/2004 | Silverbrook et al. | 7,143,341 B1 | 11/2006 | Kohli |
| 6,725,426 B1 | 4/2004 | Pavlov | 7,146,564 B2 | 12/2006 | Kim et al. |
| 6,728,755 B1 | 4/2004 | de Ment | 7,152,205 B2 | 12/2006 | Day et al. |
| 6,735,721 B1 | 5/2004 | Morrow et al. | 7,168,035 B1 | 1/2007 | Bell et al. |
| 6,745,367 B1 | 6/2004 | Bates et al. | 7,178,166 B1 | 2/2007 | Taylor et al. |
| 6,748,385 B1 | 6/2004 | Rodkin et al. | 7,190,376 B1 | 3/2007 | Tonisson |
| 6,751,777 B2 | 6/2004 | Bates et al. | 7,191,394 B1 | 3/2007 | Ardeleanu et al. |
| 6,754,874 B1 | 6/2004 | Richman | 7,213,200 B2 * | 5/2007 | Abe et al. .................. 715/513 |
| 6,757,826 B1 | 6/2004 | Paltenghe | 7,236,982 B2 | 6/2007 | Zlatanov et al. |
| 6,757,868 B1 | 6/2004 | Glaser et al. | 7,272,789 B2 | 9/2007 | O'Brien |
| 6,760,723 B2 | 7/2004 | Oshinsky et al. | 7,281,018 B1 | 10/2007 | Begun et al. |
| 6,763,343 B1 | 7/2004 | Brooke et al. | 7,296,017 B2 | 11/2007 | Larcheveque et al. |
| 6,772,139 B1 | 8/2004 | Smith, III | 7,313,758 B2 | 12/2007 | Kozlov |
| 6,772,165 B2 | 8/2004 | O'Carroll | 7,316,003 B1 | 1/2008 | Dulepet et al. |
| 6,774,926 B1 | 8/2004 | Ellis et al. | 7,318,237 B2 | 1/2008 | Moriconi et al. |
| 6,779,154 B1 | 8/2004 | Nussbaum et al. | 7,334,178 B1 | 2/2008 | Stanciu et al. |
| 6,781,609 B1 | 8/2004 | Barker et al. | 7,346,610 B2 | 3/2008 | Ruthfield et al. |
| 6,782,144 B2 | 8/2004 | Bellavita et al. | 7,346,848 B1 | 3/2008 | Ruthfield et al. |
| 6,799,299 B1 | 9/2004 | Li et al. | 7,350,141 B2 | 3/2008 | Kotler et al. |
| 6,801,929 B1 | 10/2004 | Donoho et al. | 2001/0007109 A1 | 7/2001 | Lange |
| 6,816,849 B1 | 11/2004 | Halt, Jr. | 2001/0022592 A1 | 9/2001 | Alimpich et al. |
| 6,828,992 B1 | 12/2004 | Freeman et al. | 2001/0024195 A1 | 9/2001 | Hayakawa |
| 6,845,380 B2 | 1/2005 | Su et al. | 2001/0037345 A1 | 11/2001 | Kiernan, et al. |
| 6,845,499 B2 | 1/2005 | Srivastava et al. | 2001/0054004 A1 | 12/2001 | Powers |
| 6,847,387 B2 | 1/2005 | Roth | 2001/0056429 A1 | 12/2001 | Moore et al. |
| 6,848,078 B1 | 1/2005 | Birsan et al. | 2001/0056460 A1 | 12/2001 | Sahota et al. |
| 6,850,895 B2 | 2/2005 | Brodersen et al. | 2002/0010700 A1 | 1/2002 | Wotring |
| 6,871,220 B1 | 3/2005 | Rajan et al. | 2002/0010743 A1 | 1/2002 | Ryan et al. |
| 6,874,130 B1 | 3/2005 | Baweja et al. | 2002/0010746 A1 | 1/2002 | Jilk et al. |
| 6,876,996 B2 | 4/2005 | Czajkowski et al. | 2002/0010855 A1 | 1/2002 | Reshef et al. |
| 6,889,359 B1 | 5/2005 | Conner et al. | 2002/0013788 A1 | 1/2002 | Pennell et al. |
| 6,901,403 B1 | 5/2005 | Bata et al. | 2002/0019941 A1 | 2/2002 | Chan et al. |
| 6,915,454 B1 | 7/2005 | Moore et al. | 2002/0023113 A1 | 2/2002 | Hsing et al. |
| 6,931,532 B1 | 8/2005 | Davis et al. | 2002/0026441 A1 | 2/2002 | Kutay et al. |
| 6,941,510 B1 | 9/2005 | Ozzie et al. | 2002/0026461 A1 | 2/2002 | Kutay et al. |
| 6,941,511 B1 | 9/2005 | Hind et al. | 2002/0032590 A1 | 3/2002 | Anand et al. |
| 6,941,521 B2 | 9/2005 | Lin et al. | 2002/0032692 A1 | 3/2002 | Suzuki et al. |
| 6,948,129 B1 | 9/2005 | Loghmani | 2002/0032706 A1 | 3/2002 | Perla et al. |
| 6,948,133 B2 | 9/2005 | Haley | 2002/0032768 A1 | 3/2002 | Voskuil |
| 6,948,135 B1 | 9/2005 | Ruthfield et al. | 2002/0035579 A1 | 3/2002 | Wang et al. |
| 6,950,980 B1 | 9/2005 | Malcolm | 2002/0035581 A1 | 3/2002 | Reynar et al. |
| 6,961,897 B1 | 11/2005 | Peel, Jr. et al. | 2002/0040469 A1 | 4/2002 | Pramberger |
| 6,963,875 B2 | 11/2005 | Moore et al. | 2002/0054126 A1 | 5/2002 | Gamon |
| 6,968,503 B1 | 11/2005 | Chang et al. | 2002/0057297 A1 | 5/2002 | Grimes et al. |
| 6,968,505 B1 | 11/2005 | Stoll et al. | 2002/0065798 A1 | 5/2002 | Bostleman et al. |
| 6,993,714 B2 | 1/2006 | Kaler et al. | 2002/0065847 A1 | 5/2002 | Furukawa et al. |
| 6,996,776 B1 | 2/2006 | Makely et al. | 2002/0070973 A1 | 6/2002 | Croley |
| 6,996,781 B1 | 2/2006 | Myers et al. | 2002/0078074 A1 | 6/2002 | Cho et al. |
| 7,000,179 B2 | 2/2006 | Yankovich et al. | 2002/0078103 A1 | 6/2002 | Gorman et al. |

| | | | | | |
|---|---|---|---|---|---|
| 2002/0083318 A1 | 6/2002 | Larose | 2003/0220930 A1 | 11/2003 | Milleker et al. |
| 2002/0099952 A1 | 7/2002 | Lambert et al. | 2003/0225469 A1 | 12/2003 | DeRemer et al. |
| 2002/0100027 A1 | 7/2002 | Binding et al. | 2003/0225768 A1 | 12/2003 | Chaudhuri |
| 2002/0112224 A1 | 8/2002 | Cox | 2003/0225829 A1 | 12/2003 | Pena et al. |
| 2002/0129056 A1 | 9/2002 | Conant | 2003/0226132 A1 | 12/2003 | Tondreau et al. |
| 2002/0133484 A1 | 9/2002 | Chau et al. | 2003/0233374 A1 | 12/2003 | Spinola et al. |
| 2002/0152222 A1 | 10/2002 | Holbrook | 2003/0233644 A1 | 12/2003 | Cohen et al. |
| 2002/0152244 A1 | 10/2002 | Dean et al. | 2003/0236859 A1 | 12/2003 | Vaschillo et al. |
| 2002/0156772 A1 | 10/2002 | Chau et al. | 2003/0236903 A1 | 12/2003 | Piotrowski |
| 2002/0156846 A1 | 10/2002 | Rawat et al. | 2003/0237046 A1 | 12/2003 | Parker et al. |
| 2002/0156929 A1 | 10/2002 | Hekmatpour | 2003/0237047 A1 | 12/2003 | Borson |
| 2002/0169752 A1 | 11/2002 | Kusama et al. | 2004/0002939 A1 | 1/2004 | Arora |
| 2002/0169789 A1 | 11/2002 | Kutay et al. | 2004/0002950 A1 | 1/2004 | Brennan et al. |
| 2002/0174147 A1 | 11/2002 | Wang et al. | 2004/0003031 A1 | 1/2004 | Brown et al. |
| 2002/0174417 A1 | 11/2002 | Sijacic et al. | 2004/0003353 A1 | 1/2004 | Rivera et al. |
| 2002/0178380 A1 | 11/2002 | Wolf et al. | 2004/0003389 A1 | 1/2004 | Reynar et al. |
| 2002/0184219 A1 | 12/2002 | Preisig et al. | 2004/0010752 A1* | 1/2004 | Chan et al. .................. 715/513 |
| 2002/0188597 A1 | 12/2002 | Kern et al. | 2004/0024842 A1 | 2/2004 | Witt |
| 2002/0188613 A1 | 12/2002 | Chakraborty et al. | 2004/0030991 A1 | 2/2004 | Hepworth et al. |
| 2002/0194219 A1 | 12/2002 | Bradley et al. | 2004/0039990 A1 | 2/2004 | Bakar et al. |
| 2002/0196281 A1 | 12/2002 | Audleman et al. | 2004/0039993 A1 | 2/2004 | Kougiouris et al. |
| 2002/0196288 A1 | 12/2002 | Emrani | 2004/0044961 A1 | 3/2004 | Pesenson |
| 2002/0198891 A1 | 12/2002 | Li et al. | 2004/0044965 A1 | 3/2004 | Toyama et al. |
| 2002/0198935 A1 | 12/2002 | Crandall, Sr. et al. | 2004/0054966 A1 | 3/2004 | Busch et al. |
| 2003/0004951 A1 | 1/2003 | Chokshi | 2004/0059754 A1 | 3/2004 | Barghout et al. |
| 2003/0007000 A1 | 1/2003 | Carlson et al. | 2004/0073565 A1 | 4/2004 | Kaufman et al. |
| 2003/0014397 A1 | 1/2003 | Chau et al. | 2004/0073868 A1 | 4/2004 | Easter et al. |
| 2003/0018668 A1 | 1/2003 | Britton et al. | 2004/0078756 A1 | 4/2004 | Napper et al. |
| 2003/0020746 A1 | 1/2003 | Chen et al. | 2004/0083426 A1 | 4/2004 | Sahu |
| 2003/0023641 A1 | 1/2003 | Gorman et al. | 2004/0088647 A1 | 5/2004 | Miller et al. |
| 2003/0026507 A1 | 2/2003 | Zlotnick | 2004/0088652 A1 | 5/2004 | Abe et al. |
| 2003/0028550 A1 | 2/2003 | Lee et al. | 2004/0093596 A1 | 5/2004 | Koyano |
| 2003/0037303 A1 | 2/2003 | Bodlaender et al. | 2004/0107367 A1 | 6/2004 | Kisters |
| 2003/0043986 A1 | 3/2003 | Creamer et al. | 2004/0117769 A1 | 6/2004 | Lauzon et al. |
| 2003/0046665 A1 | 3/2003 | Ilin | 2004/0123277 A1 | 6/2004 | Schrader et al. |
| 2003/0048301 A1 | 3/2003 | Menninger | 2004/0146199 A1 | 7/2004 | Berkner et al. |
| 2003/0051243 A1 | 3/2003 | Lemmons et al. | 2004/0148178 A1 | 7/2004 | Brain |
| 2003/0055811 A1 | 3/2003 | Stork et al. | 2004/0163041 A1 | 8/2004 | Engel |
| 2003/0055828 A1 | 3/2003 | Koch et al. | 2004/0172442 A1 | 9/2004 | Ripley |
| 2003/0056198 A1 | 3/2003 | Al-Azzawe et al. | 2004/0181711 A1 | 9/2004 | Johnson et al. |
| 2003/0061386 A1 | 3/2003 | Brown | 2004/0186762 A1 | 9/2004 | Beaven et al. |
| 2003/0061567 A1 | 3/2003 | Brown et al. | 2004/0189716 A1 | 9/2004 | Paoli et al. |
| 2003/0084424 A1 | 5/2003 | Reddy et al. | 2004/0194035 A1 | 9/2004 | Chakraborty |
| 2003/0093755 A1 | 5/2003 | O'Carroll | 2004/0205473 A1 | 10/2004 | Fisher et al. |
| 2003/0110443 A1 | 6/2003 | Yankovich et al. | 2004/0205525 A1 | 10/2004 | Murren et al. |
| 2003/0120578 A1 | 6/2003 | Newman | 2004/0205534 A1 | 10/2004 | Koelle |
| 2003/0120651 A1 | 6/2003 | Bernstein et al. | 2004/0205571 A1 | 10/2004 | Adler |
| 2003/0120659 A1 | 6/2003 | Anandampillai | 2004/0205592 A1 | 10/2004 | Huang |
| 2003/0120671 A1 | 6/2003 | Kim et al. | 2004/0205605 A1 | 10/2004 | Adler et al. |
| 2003/0120686 A1 | 6/2003 | Kim et al. | 2004/0205653 A1 | 10/2004 | Hadfield et al. |
| 2003/0126555 A1 | 7/2003 | Aggarwal et al. | 2004/0205671 A1 | 10/2004 | Sukehiro et al. |
| 2003/0128196 A1 | 7/2003 | Lapstun et al. | 2004/0210599 A1 | 10/2004 | Friedman et al. |
| 2003/0135825 A1 | 7/2003 | Gertner et al. | 2004/0210645 A1 | 10/2004 | Kouznetsov et al. |
| 2003/0140132 A1 | 7/2003 | Champagne et al. | 2004/0221238 A1 | 11/2004 | Cifra et al. |
| 2003/0142072 A1 | 7/2003 | Lapstun et al. | 2004/0221245 A1 | 11/2004 | Chickles et al. |
| 2003/0149934 A1 | 8/2003 | Worden | 2004/0237030 A1 | 11/2004 | Malkin |
| 2003/0158897 A1 | 8/2003 | Ben-Natan et al. | 2004/0260593 A1 | 12/2004 | Abraham-Fuchs et al. |
| 2003/0163285 A1* | 8/2003 | Nakamura et al. .......... 702/179 | 2004/0261019 A1* | 12/2004 | Imamura et al. ............ 715/513 |
| 2003/0167277 A1 | 9/2003 | Hejlsberg et al. | 2004/0268229 A1 | 12/2004 | Paoli et al. |
| 2003/0182268 A1 | 9/2003 | Lal | 2005/0004893 A1 | 1/2005 | Sangroniz |
| 2003/0182327 A1 | 9/2003 | Ramanujam et al. | 2005/0005248 A1 | 1/2005 | Rockey et al. |
| 2003/0187756 A1 | 10/2003 | Klivington, Eva T., et al. | 2005/0015279 A1 | 1/2005 | Rucker |
| 2003/0187930 A1 | 10/2003 | Ghaffar et al. | 2005/0015732 A1 | 1/2005 | Vedula et al. |
| 2003/0188260 A1 | 10/2003 | Jensen et al. | 2005/0022115 A1 | 1/2005 | Baumgartner et al. |
| 2003/0189593 A1 | 10/2003 | Yarvin | 2005/0028073 A1 | 2/2005 | Henry et al. |
| 2003/0192008 A1 | 10/2003 | Lee | 2005/0033728 A1 | 2/2005 | James |
| 2003/0200506 A1* | 10/2003 | Abe et al. .................. 715/513 | 2005/0038711 A1 | 2/2005 | Marlelo |
| 2003/0204511 A1 | 10/2003 | Brundage | 2005/0055627 A1 | 3/2005 | Lloyd et al. |
| 2003/0204814 A1 | 10/2003 | Elo et al. | 2005/0060324 A1 | 3/2005 | Johnson et al. |
| 2003/0205615 A1 | 11/2003 | Marappan | 2005/0060721 A1 | 3/2005 | Choudhary et al. |
| 2003/0212664 A1 | 11/2003 | Breining et al. | 2005/0065933 A1 | 3/2005 | Goering |
| 2003/0212902 A1 | 11/2003 | van der Made | 2005/0065936 A1 | 3/2005 | Goering |
| 2003/0217053 A1 | 11/2003 | Bachman et al. | 2005/0066287 A1 | 3/2005 | Tattrie et al. |

| | | | | | | |
|---|---|---|---|---|---|---|
| 2005/0071752 | A1 | 3/2005 | Marlatt | JP | 6180698 | 6/1994 |
| 2005/0076049 | A1 | 4/2005 | Qubti et al. | JP | 2000132436 | 5/2000 |
| 2005/0091285 | A1 | 4/2005 | Krishnan et al. | JP | 2002183652 | 6/2002 |
| 2005/0091305 | A1 | 4/2005 | Lange et al. | JP | 2003173288 | 6/2003 |
| 2005/0097536 | A1 | 5/2005 | Bernstein et al. | WO | WO 99/24945 | 5/1999 |
| 2005/0102370 | A1 | 5/2005 | Lin et al. | WO | WO 99/56207 | 11/1999 |
| 2005/0102612 | A1 | 5/2005 | Allan et al. | WO | WO 01/44934 | 6/2001 |
| 2005/0108104 | A1 | 5/2005 | Woo | WO | WO0157720 | 8/2001 |
| 2005/0108624 | A1 | 5/2005 | Carrier | | | |
| 2005/0114757 | A1 | 5/2005 | Sahota et al. | | | |
| 2005/0132043 | A1 | 6/2005 | Wang et al. | | | |
| 2005/0132196 | A1 | 6/2005 | Dietl | | | |
| 2005/0138031 | A1 | 6/2005 | Wefers | | | |
| 2005/0138086 | A1 | 6/2005 | Pecht-Seibert | | | |
| 2005/0138539 | A1 | 6/2005 | Bravery et al. | | | |
| 2005/0149375 | A1 | 7/2005 | Wefers | | | |
| 2005/0160398 | A1 | 7/2005 | Bjornson et al. | | | |
| 2005/0171746 | A1 | 8/2005 | Thalhammer-Reyero | | | |
| 2005/0198086 | A1 | 9/2005 | Moore | | | |
| 2005/0198125 | A1 | 9/2005 | Beck et al. | | | |
| 2005/0198247 | A1 | 9/2005 | Perry et al. | | | |
| 2005/0210263 | A1 | 9/2005 | Levas et al. | | | |
| 2005/0223063 | A1 | 10/2005 | Chang et al. | | | |
| 2005/0223320 | A1 | 10/2005 | Brintzenhofe et al. | | | |
| 2005/0246304 | A1 | 11/2005 | Knight et al. | | | |
| 2005/0262112 | A1 | 11/2005 | Moore | | | |
| 2005/0268222 | A1 | 12/2005 | Cheng | | | |
| 2006/0020586 | A1 | 1/2006 | Prompt et al. | | | |
| 2006/0026534 | A1 | 2/2006 | Ruthfield et al. | | | |
| 2006/0031757 | A9 | 2/2006 | Vincent, III | | | |
| 2006/0036995 | A1 | 2/2006 | Chickles et al. | | | |
| 2006/0041838 | A1 | 2/2006 | Khan | | | |
| 2006/0059107 | A1 | 3/2006 | Elmore et al. | | | |
| 2006/0059434 | A1 | 3/2006 | Boss et al. | | | |
| 2006/0069605 | A1 | 3/2006 | Hatoun | | | |
| 2006/0069985 | A1 | 3/2006 | Friedman et al. | | | |
| 2006/0080657 | A1 | 4/2006 | Goodman | | | |
| 2006/0085409 | A1 | 4/2006 | Rys et al. | | | |
| 2006/0101037 | A1 | 5/2006 | Brill et al. | | | |
| 2006/0101051 | A1 | 5/2006 | Carr et al. | | | |
| 2006/0129978 | A1 | 6/2006 | Abriani et al. | | | |
| 2006/0143220 | A1 | 6/2006 | Spencer, Jr. | | | |
| 2006/0161559 | A1* | 7/2006 | Bordawekar et al. ........ 707/100 | | | |
| 2006/0173865 | A1 | 8/2006 | Fong | | | |
| 2006/0200754 | A1 | 9/2006 | Kablesh et al. | | | |
| 2007/0036433 | A1 | 2/2007 | Teutsch | | | |
| 2007/0050719 | A1 | 3/2007 | Lui et al. | | | |
| 2007/0061467 | A1 | 3/2007 | Essey | | | |
| 2007/0061706 | A1 | 3/2007 | Cupala | | | |
| 2007/0074106 | A1 | 3/2007 | Ardeleanu | | | |
| 2007/0094589 | A1 | 4/2007 | Paoli | | | |
| 2007/0100877 | A1 | 5/2007 | Paoli | | | |
| 2007/0101280 | A1 | 5/2007 | Paoli | | | |
| 2007/0118803 | A1 | 5/2007 | Walker et al. | | | |
| 2007/0130504 | A1* | 6/2007 | Betancourt et al. .......... 715/505 | | | |
| 2007/0186157 | A1 | 8/2007 | Walker et al. | | | |
| 2007/0208606 | A1 | 9/2007 | MacKay et al. | | | |
| 2007/0208769 | A1* | 9/2007 | Boehm et al. ............... 707/102 | | | |
| 2008/0028340 | A1 | 1/2008 | Davis | | | |

FOREIGN PATENT DOCUMENTS

| | | |
|---|---|---|
| EP | 0961197 | 12/1999 |
| EP | 1076290 | 2/2001 |
| EP | 1221661 | 7/2002 |
| JP | 63085960 | 4/1988 |
| JP | 401173140 | 7/1989 |
| JP | 3191429 | 8/1991 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |

OTHER PUBLICATIONS

StylusStudio, StylusStudio: XPath Tools, 2004-2007, StylusStudio, pp. 1-14.*
Dodds, Toward an XPath API, Mar. 7, 2001, xml*com, pp. 1-3.*
Altova, Altova Tools for Xpath 1.0/2.0, 2007, Altova, pp. 1-12.*
Grosso, et al., "XML Fragment Interchange", W3C,(Feb. 2001), 1-28.
Altova, et al., "User and Reference Manual Version 4.4", www.xmlspy.com, (May 24, 2007), 1-565.
"XForm 1.0", W3C,(Jul. 16, 2001).
Altova, Inc., "XML Spy 4.0 Manual," Altova Inc. & Altova GmbH, coyright 1998-2001, Chapters 1, 2, and 6, encompassing pp. 1-17, 18-90, and 343-362.
Cybook, INC.: "Copying the Search Form to Services-based Web Sites" INternet Article, (online) Jul. 26, 2004.*the whole document*.
Excel Developer Tip (hereinafter "Excel"), "Determining the Data Type of a Cell", May 13, 1998, p. 1 (available at http://jwalk.com/ss//excel/tips/tip62.htm).
Macromedia, INC.: "Dreamweaver Technote, Changes in copying and pasting in Dreamweaver 4" Internet Article (online). *the whole document*.
Rado, Dave: "How to create a template that makes it easy for users to "fill in the blanks", without doing any programming" Microsoft Word MVP FAQ Site, (online) Apr. 30, 2004, the whole document.
"Architecture for a Dynamic Information Area Control" IBM Technical Disclosure Bulletin IBM Corp. New York US vol. 37 No. 10 Jan. 10, 1994. pp. 245-246.
Alschuler Liora "A tour of Xmetal" O'Reilly XML.com 'Online Jul. 14, 1999, XP002230081 retrieved from the internet: <URL:http://www.xml.com/pub/a/SeyboldReport/ip0311025.html> retrieved on Feb. 5, 2003.
Au Irene et al. "Netscape Communicator's Collapsible Toolbars" CHI'98 Human Factors in Computing Systems Conference Proceedings Los Angeles CA Apr. 18-23, 1998 pp. 81-86.
Battle Steve A. et al.; "Flexible Information Presentation with XML" 1998 The Institution of Electrical Engineers 6 pages.
Brogden William; "Arbortext Adept 8 Editor Review" O'Reilly XML.com 'Online! Sep. 22, 1999 XP002230080 retrieved from the Internet <URL:http://www.xml.com/pub/a/1999/09/adept/AdeptRvw.htm> retrieved on Feb. 5, 2003.
Chen Yi et al.: A; "XKvalidator: A Constraint Validator for XML" CIKM '-2 Nov. 4-9, 2002 Copyright 2002 ACM 1-58113-492-4/02/0011 pp. 446-452.
Ciancarini Paolo et al.; "Managing Complex Documents Over the WWW: A Case Study for XML" IEEE Transactions on Knowledge and Data Engineering Vo.l. 11 No. 4 Jul./Aug. 1999. pp. 629-938.
Davidow Ari: Alie; "XML Editors: Allegations of Functionality in search of reality" Internet 'Online! 1999 XP002230082 retrieved from the Internet <URL:http://www.ivritype.com/xml/>.
Kanemoto Hirotaka et al; "An Efficiently Updatable Index Scheme for Structured Documents" 1998 IEEE pp. 991-996.
Sutanthavibul Supoj et al.; "XFIG Version 3.2 Patchlevel 2 (Jul. 2, 1998) Users Manual (Edition 1.0)" Internet Document [Online] Jul. 2, 1998 XP002229137 Retrieved from the Internet: <URL:http://www.ice.mtu.edu/online_docs/xfig332/> [retrieved on Jan. 28, 2003].
Usdin Tommie et al.; Not a; "XML: Not a Silver Bullet But a Great Pipe Wrench" Standardview vol. 6. No. 3 Sep. 1998 pp. 125-132.
Chien Shu-Yao et al.; "Efficient Management of Multiversion Documents by Object Referencing" Proceedings of the 27th VLDB Conference 2001 pp. 291-300.
Chien Shu-Yao et al.; "Efficient schemes for managing mulitversion XML documents" VLDB Journal (2002) pp. 332-352.

Chien Shu-Yao et al.; "Storing and Querying Multiversion XML Documents using Durable Node Numbers" IEEE 2002 pp. 232-241.

Chien Shu-Yao et al.; "XML Document Versioning" SIGMOD Record vol. 30 No. 3 Spet 2001 pp. 46-53.

Dyck Timothy; "XML Spy Tops as XML Editor" http://www.eweek.com/article2/0395972404100.asp Nov. 25, 2002 4 pages.

Haukeland Jan-Henrick; "Tsbiff—tildeslash biff—version 1.2.1" Internet Document [Online] Jun. 1999 URL: http://web.archive.org/web/19990912001527/http://www.tildeslash.com/tsbiff/.

Nelson Mark; "Validation with MSXML and XML Schema" Windows Developer Magazine Jan. 2002 pp. 35-38.

Netscape Communication Corpora; "Netscape Communicator 4.61 for OS/2 Warp" Software 1999 The whole software release & "Netscape—Version 4.6 [en]-010615" Netscape Screenhot Oct. 2, 2002.

Noore A.; "A secure conditional access system using digital signature and encryption" 2003 Digest of Technical Papers. International Conference on Consumer Electronics Jun. 2003 pp. 220-221.

Rogge et al.; "Validating MPEG-21 Encapsulated Functional Metadata" IEEE 2002 pp. 209-212.

Wong Raymond K. et al.; "Managing and Querying Multi-Version XML Data with Update Logging" DocEng '02 Nov. 8-9, 2002 Copyright 2002 ACM 1-58113-594-7/02/0011 pp. 74-81.

Cheng Ya Bing et al.; "Designing Valid XML Views" ER 2002 LNCS 2503 2002 Springer-Verlag Berlin Heidelberg 2002 pp. 463-477.

Chuang Tyng-Ruey; "Generic Validation of Structural Content with Parametric Modules" ICFP '01 Sep. 3-5, 2001 Copyright 2001 ACM 1-58113-415-0/01/0009 pp. 98-109.

Dayton Linnea and Jack Davis; "Photo Shop 5/5.5 WOW! Book" 2000 Peachpit Press pp. 8-17.

Hall Richard Scott; "Agent-based Software Configuration and Deployment" Thesis of the University of Colorado Online Dec. 31, 1999 retrieved from the Internet on Nov. 7, 2003: <http://www.cs.colorado.edu/users/rickhall/documents/ThesisFinal.pdf> 169 pages.

Hardy Mathew R. B. et al; "Mapping and Displaying Structural Transformations between XML and PDF" DocEng '02 Nov. 8-9, 2002 Copyright 2002 ACM 1-58113-597-7/02/0011 pp. 95-102.

Kim Sang-Kyun et al.; "Immediate and Partial Validation Mechanism for the Conflict Resolution of Update Operations in XML Databases" WAIM 2002 LNCS 2419 2002 pp. 387-396 Springer-Verlag Berlin Heidelberg 2002.

Netscape Communication Corp; "SmartUpdate Developer's Guide" Online Mar. 11, 1999 retrieved from the Internet on Dec. 8, 2000: <http://developer.netscape.com:80/docs/manuals/communicator/jarman/index.htm> 83 pages.

Tomimori et al.; "An Efficient and Flexible Access Control Framework for Java Programs in Mobile Terminals"; 22nd International Conference on Distributed Computing Systems Workshops; 2002; pp. 777-782.

Van Hoff Arthur et al.; "The Open Software Description Format" Online Aug. 13, 1997 retrieved from the Internet on Nov. 7, 2003: <http://www.w3.org/TR/NOTE-OSD> 11 pages.

Verlamis Iraklis et al.; "Bridging XML-Schema and relational databases. A System for generating and manipulating relational databases using valid XML documents." DocEng '01 Nov. 9-10, 2001 Coppyright 2001 ACM 1-58113-432-0/01/0011 pp. 105-114.

Williams Sara and Charlie Kin; "The Component Object Model" A Technical Overview Oct. 1994 Microsoft Corp. pp. 1-14.

Pacheco et al., "Delphi 5 Developer's Guide," Sams Publishing, 1999, Chapter 31 Section: Data Streaming, 6 pages.

"Netscape window," Netscape Screenshot Oct. 2, 2002.

Clarke, P., "From small beginnings" Knowledge Management Nov. 2001, pp. 28-30.

Hwang et al., "Micro-Firewalls for Dynamic Network Security with Distributed Intrusion Detection"; IEEE International Symposium on Network Computing and Applications; 2001; pp. 68-79.

Kaiya et al., "Specifying Runtime Environments and Functionalities of Downloadable Components Under the Sandbox Mode"; International Symposium on Principles of Software Evolution; 2000; pp. 138-142.

Komatsu N. et al., "A Proposal on Digital Watermark in Document Image Communication and Its Application to Realizing a Signature" Electronics and Communications in Japan Part 1: Communications vol. 73 No. 5, May 1990, pp. 22-33.

Sun Q. et al., "A robust and secure media signature scheme for JPEG images" Proceedings of 2002 IEEE Workshop on Multimedia Signal Processing, Dec. 2002, pp. 296-299.

Prevelakis et al., "Sandboxing Applications"; Proceedings of the FREENIX Track; 2001; pp. 119-126.

Schmid et al., "Protection Data from Malicious Software"; 18th Annual Computer Security Applications Conference; 2002; pp. 199-208.

Trupin J., "The Visual Programmer," Microsoft Systems Journal, Apr. 1996, pp. 103-105.

Zdonik S., "Object Management System Concepts," ACM, 1984, pp. 13-19.

"Store and Organize Related Project Files in a Binder," Getting Results with Microsoft Office, 1990, pp. 109-112.

Barker et al., "Creating In-Line Objects Within An Integrated Editing Environment," IBM Technical Disclosure Bulletin, vol. 27, No. 5, Oct. 1984, p. 2962.

Berg A., "Naming and Binding: Monikers" Inside OLE, 1995, Chapter 9, pp. 431-490.

Clapp D., "The NeXT Application Kit Part I: Non-Responsive Classes," The NeXT Bible 1990, Chapter 16, pp. 275-293.

DiLascia et al., "Sweeper" Microsoft Interactive Developer, vol. 1, No. 1, 1996, 27 pages.

Herzner et al., "CDAM-Compound Document Access and Management. An Object-Oriented Approach" Multimedia Systems Interaction and Applications, 1992, Chapter 3, pp. 17-36.

Kobayashi et al., "An Update on BTRON-specification OS Development," IEEE 1991 pp. 132-140.

Peterson B., "Unix Variants," Unix Review, vol. 10, No. 4, Apr. 1992, pp. 29-31.

Pike et al., "Plan 9 from Bell Labs" UKUUG, Summer 1990, 10 pages.

Pike et al., "The Use of Name Spaces in Plan 9," Operating Systems Review vol. 27, No. 2, Apr. 1993, pp. 72-76.

Staneck W., "Internal and External Media" Electronic Publishing Unleashed, 1995, Chapter 22, pp. 510-542.

Clark James—W3C Editor; "XSL Transformation (XSLT) Verison 1.0" Nov. 16, 1999 W3C (MIT INRIA Kejo) pp. 1-156.

Description of Whitehill Composer software product producted by Whitehill Technologies Inc. available at <http://www.xml.com/pub/p/221> accessed on Apr. 8, 2004, two pages.

McCright J.S.; "New Tool Kit to Link Groove with Microsoft Sharepoint" eWeek Enterprise News & Reviews Ziff Davis Media INc. Jul. 29, 2002 1 page.

Musgrave S; "Networking technology—impact and opportunities" Survey and Statistical Computing 1996. Proceedings of the Second ASC International Conference. Sep. 1996. pp. 369-378. London UK.

Rapaport L; "Get more from SharePoint" Transform Magazine vol. 11 No. 3. Mar. 2002 pp. 1315.

W3C Editor James Clark and Ste; "XML Path Language (XPath) Version 1.0" Nov. 16, 1999W3C (MIT INRIA Kejo) pp. 1-49.

OMG XML Metadata Interchange (XMI) Specification Version 1.2 Jan. 2002.

IBM: Stack Algorithm for Extractin Subtree from Serialized Tree, Mar. 1, 1994, TDB-ACC-NONN94033, 3 pages.

Laura Acklen & Read Gilgen, "Using Corel Wordperfect 9", 251-284, 424-434, 583-586 (1998).

Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.

Leblond et al, "PC Magazine Guide to Quattro Pro for Windows", pp. 9-11, 42-61, Ziff-Davis Press, Copyright 1993 by the LeBlond Group.

Mansfield, "Excel 97 for Busy People", Published by Osborne/Mcgraw-Hill 1997 pp. 48-50.

"Microsoft Visual Basic 5.0 Programmer's Guide 1997"; pp. 578-579; Redmond WA 98052-6399.

Han et al., WebSplitter: A Unified XML Framework for Multi-Device Collaborative Web Browsing, 2000, ACM Conference on Cimputer Supported Cooperative Work, 10 pages.

Anat, Eyal et al., "Integrating and Customizing Hererogeneous E-Commerce Applications", The VLDB Journal-The International Journal on Very Large Data Bases, vol. 10, Issue 1,(Aug. 2001),16-38.

Adams, Susie et al., "BizTalk Unleashed", Sams publishing, 2002, first printing Mar. 2001,(Mar. 2001),1-2, 31-138.

Vasters, Clemens F., "BizTalk Server 2000 A Beginner's Guide", Osborne/McGraw-Hill,(2001),1-2, 359-402.

Halberg, Bruce et al., "Using Microsoft Excel 97", (1997), 191-201, 213-219.

Villard, et al., "An Incremental XSLT Transformation Processor for XML Document Manipulation", http://www2002.org/CDROM/refereed/321, Printed on May 18, 2007,(May 2002),25 pages.

"Enter Key", Retrieved from the Internet at http://systems.webopedia.com/TERM/Enter_key.html on Dec. 20, 2006.

"Microsoft Visual Basic 5.0 Programmer's Guide", *Microsoft Press,* (1997), pp. 42-43, 54-58.

"Microsoft Word 2000", Screenshots,(1999), 1-5.

Beauchemin, Dave , "Using InfoPath to Create Smart Forms", Retrieved from the Internet at http:/www.microsoft.com/office/infopath/prodinfo/using.mspx on Jan. 21, 2007,(Mar. 27, 2003).

Begun, Andrew , et al., "Support and Troubleshooting for XML Schemas in InfoPath 2003", *Microsoft Office InfoPath 2003 Technical Articles,* Retrieved from the Internet at http://msdn2.microsoft.com/en-us/library/aa168241(office.11,d=printer).aspx on Jan. 21, 2007,(Aug. 2004).

Borland, Russo , "Running Microsoft Word 97", 314-315, 338, 361-362, 390, and 714-719.

Brabrand, et al., "Power Forms Declarative Client-side Form Field Validation", (2002), 1-20.

Dubinko, Micah , "XForms and Microsoft InfoPath", Retrieved from the Internet at http://www.xml.com/lpt/a/1311 on Jan. 21, 2007,(Oct. 29, 2003).

Hoffman, Michael , "Architecture of Microsoft Office InfoPath 2003", *Microsoft Office InfoPath 2003 Technical Articles,* Retrieved from the Internet at http://msdn2.microsoft.com/en-us/library/aa219024(office.11,d=printer).aspx on Jan. 21, 2007,(Jun. 2003).

Lehtonen, Miro , et al., "A Dynamic User Interface for Document Assembly", Department of Computer Science, University of Helsinki,(Nov. 2002).

Nelson, Joe , "Client-side Form Validation using JavaScript", *Developer Advisory,* (Sep. 21, 2001).

Raman, T. V., et al., "XForms 1.0", (Dec. 2001),Section 1-12.2.3 & Appendices A-G.

Rees, Michael J., "Evolving the Browser Towards a Standard User Interface Architecture", School of Information Technology, Bond University, Australia,(2001).

Singh, Darshan , "Microsoft InfoPath 2003 By Example", Retrieved from the Internet at http://www.perfectxml.com/InfoPath.asp on Jan. 21, 2007,(Apr. 20, 2003).

Udell, Jon , "InfoPath and XForms", Retrieved from the Internet at http://weblog.infoworld.com/udell/2003/02/26.html,(Feb. 26, 2003).

Microsoft Corporation, "Microsoft Computer Dictionary" Microsoft Press, Fifth Edition, p. 149.

Cover, XML Forms Architecture, retrieved at << http://xml.coverpages.org/xfa.html>> on Aug. 17, 2006, Coverpages, Jun. 16, 1999.

Raggett, "HTML Tables", retrieved on Aug. 6, 2006, at <<http:www://is-edu.hcmuns.edu.vn/WebLib/books/Web/Tel/html>>, W3C Internet Draft, Jul. 7, 1995, pp. 1-12.

"Webopedia Computer Dictionary" retrieved on May 9, 2006, at <<http://www.pewebopedia.com/TERM/O/OLE.html>>, Jupitermedia Corporation, 2006, pp. 07.

Atova, "User Reference manual Version 4.4, XML Spy suite 4.4," Atova Ges.m.b.H and Altova, Inc., May 24, 2002, pages cover, copyright page, 1-565.

Altova et al. XML Spy, XML integrated Development Environments, Altova Inc., 2002, pp. 1-18.

Ben-Natan, U.S. Appl. No. 60/203,081, filed May 9, 2000, entitled "Internet platform for creating and supporting communities".

Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downlowad pp. 1-16.

Kutay, U.S. Appl. No. 60/209,713, filed Jun. 5, 2000, entitled, "Methods and systems for accessing, organizing presenting and viewing data".

Microsoft Word 2000 (see Screen Shot "About Microsoft Word") Published 1983-1999 and Microsoft Excel 2000 (see Screen Shot "About Microsoft Excel") Published 1988-1999, Three pages.

Moore, U.S. Appl. No. 60/191,662, filed Mar. 23, 2000, entitled "Collection-based presistent digital archives".

"Microsoft Word 2000 Screenshots", (2000),11-17.

"Microsoft Word 2000 Screenshots", Word,(2000),1-17.

Pacheco, Xavier et al., "Delphi 5 Developer's Guide", Sams Publishing. Chapter 31, Section: Data Streaming,(1999),4.

Bradley, Neil "The XML Companion, Third Edition", *Published by Addison Wesley Professional,* http://proquest.safaribooksonline.com0201770598, http,(Dec. 12, 2001), 1-18.

Klarlund, Nils "DSD: A Schema Language for XML", *ACM, FSMP Portland Oregon,* (2000),101-111.

Watt, Andrew "MIcrosoft Office Infopath 2003 Kick Start", *(Published by Sams) Print ISBN-10:0-672-32623-X,* (Mar. 24, 2004),1-57.

Hu, et al., "A Programmable Editor for Developing Structured Documents based on Bidirectional Transformations", ACM,(Aug. 2004),178-179.

Bray, Tim "Extensible Markup Language (XML)", http://www.textuality.com/sgml-erb/WD-xml.html, second named inventor Jean Paoli, third named inventor C.M. Sperberg-McQueen,(Feb. 10, 1998),37 Pages.

* cited by examiner

Fig. 4

Expense Report

Report Date: | Expense Code: | Expense Period: ___ to ___

Business Purpose:

Employee
Name: | E-mail Address:

Itemized Expenses

| Date | Description | Category | Cost |
|---|---|---|---|
| | | | $0.00 |
| | | Subtotal | $0.00 |
| | | Less cash advance | |
| | | Total expenses | $0.00 |

Repeating Table

Notes

— 302

Selected Function — 402

To add a field or group to the formula, click Insert Field or Group. To add a standard function, click Insert Function.

Formula:
sum(double click to insert field) — 406

[Insert Field or Group...] [Insert Function...] [Verify Formula]
— 404          — 408

☐ Edit XPath (advanced)

[OK] [Cancel] [Help]

Fig. 6

STRUCTURED-DOCUMENT PATH-LANGUAGE EXPRESSION METHODS AND SYSTEMS

TECHNICAL FIELD

This invention relates to structured-document path-language expression methods and systems.

BACKGROUND

Extensible markup language (XML) is increasingly becoming the preferred format for electronic documents. XML is a tag-based hierarchical language that is extremely rich in terms of the information that it can be used to represent. For example, XML can be used to represent information spanning the spectrum from semi-structured information (such as one would find in a word processing document) to generally structured information (such as that which is contained in a table). For more information on XML, the reader is referred to the XML 1.0 Second Edition Specification which is the work of and currently available from the W3C (World Wide Web consortium).

To locate and process data in XML documents, another language, called the XML Path Language ("XPath"), can be used. XPath includes an addressing syntax for locating nodes in an XML document's hierarchical structure and functions performable on or with the nodes. XPath is a W3C standard. For more information, the reader is referred to the W3C's website, where information about XPath is currently located.

Using XPath, however, can be tedious and require a significant understanding of XPath and XML. To write XPath expressions, for instance, a user often needs lengthy training in how the XPath syntax is constructed and which functions it can perform. Even with this training, writing XPath expressions can be tedious and time consuming. XPath is also unforgiving; a small syntactical error, like a period or comma out of place, can make an XPath expression fail. If the expression fails, XPath is often not helpful in showing the user how to fix the error.

Assume, for example, that a user wishes to write an XPath expression to add the data in two of the "cost" nodes listed below. The namespaces listed below represent names for hierarchically arranged nodes of an XML document.

NS1:myfields
  NS1:items
    NS1:item
      NS1:quantity
      NS1:price
      NS1:cost
    NS1:item
      NS1:quantity
      NS1:price
      NS1:cost
    NS1:item
      NS1:quantity
      NS1:price
      NS1:cost
    NS1:item
      NS1:quantity
      NS1:price
      NS1:cost If the user understands XML and XPath, he or she can write the XPath expression by: 1) determining what syntax is needed to address the first cost node; 2) typing in that syntax; 3) determining what syntax is needed to perform the function of addition; 4) typing in that syntax; 5) determining what syntax is needed to address the third node; and 6) typing in that syntax.

Thus, to construct an XPath expression that can add data within the first and third "cost" nodes, the user has to determine the syntax to address the first cost node and type it in:

/NS1:myfields/NS1:items/NS1:item/NS1:cost[1]

Next, the user has to determine the syntax for the function of addition, which is the "+" symbol. While this symbol is intuitive, many other XPath functions are not intuitive and so can require training to understand. The user then types the "+" symbol in:

/NS1:myfields/NS1:items/NS1:item/NS1:cost[1]+

Next, the user must determine the syntax to address the third cost node and type it in:

/NS1:myfields/NS1:items/NS1:item/NS1:cost[1]+/NS1:myfields/NS1/items /NS1:item/NS1:cost[3]

As this example shows, writing even a simple XPath expression can require training in XML and XPath, and can be tedious and time consuming as well. Also, even a small error in an XPath expression's syntax can cause the expression to fail, potentially requiring the user to find and fix the error or retype the expression.

Given the foregoing, there is a need for a user-friendly and/or non-technical way to create XPath expressions.

SUMMARY

Systems and methods ("tools") for building and/or simplifying path-language expressions for structured documents are described. In at least some embodiments, these tools enable a user to graphically select structured-document path-language functions and addresses. With these addresses and functions, a structured-document path-language expression can be built without a user having to fully understand or type in syntax for the expression.

In at least some embodiments, the tools can also simplify structured-document path-language address and function syntax. This simplification can aid a user in building and easily understanding a structured-document path-language expression.

BRIEF DESCRIPTION OF THE DRAWINGS

FIG. 4 illustrates an exemplary electronic form and an exemplary function presentation window.

FIG. 6 illustrates an exemplary electronic form and an exemplary address and function window having an exemplary minimally logical form of an XPath addressing syntax.

The same numbers are used throughout the disclosure and figures to reference like components and features.

DETAILED DESCRIPTION

Overview

Systems and methods ("tools") for building and/or simplifying structured-document path-language expressions are described below. In at least some embodiments, these tools can enable a user to select parts of a hierarchically structured electronic document though a user interface. The tools then generate an addressing syntax for the selected parts. By so doing, a user is able to add addressing syntax for the selected parts without having to understand or type in the addressing syntax.

In at least some embodiments, the tools can also present addressing syntax to the user in a simplified form, such as with an abbreviation of the syntax or with symbols. This enables users who may not understand path-language addressing syntax to understand what parts of an electronic document they have selected.

In at least some embodiments, the tools can also enable a user to select functions for a structured-document path-language expression to perform, such as from a window in a user interface. The tools then generate a proper syntax for the selected function. This function syntax can be presented to the user in simplified or modified form to further enable a user to understand the path-language expression being built.

Exemplary Architecture

Figure 1:
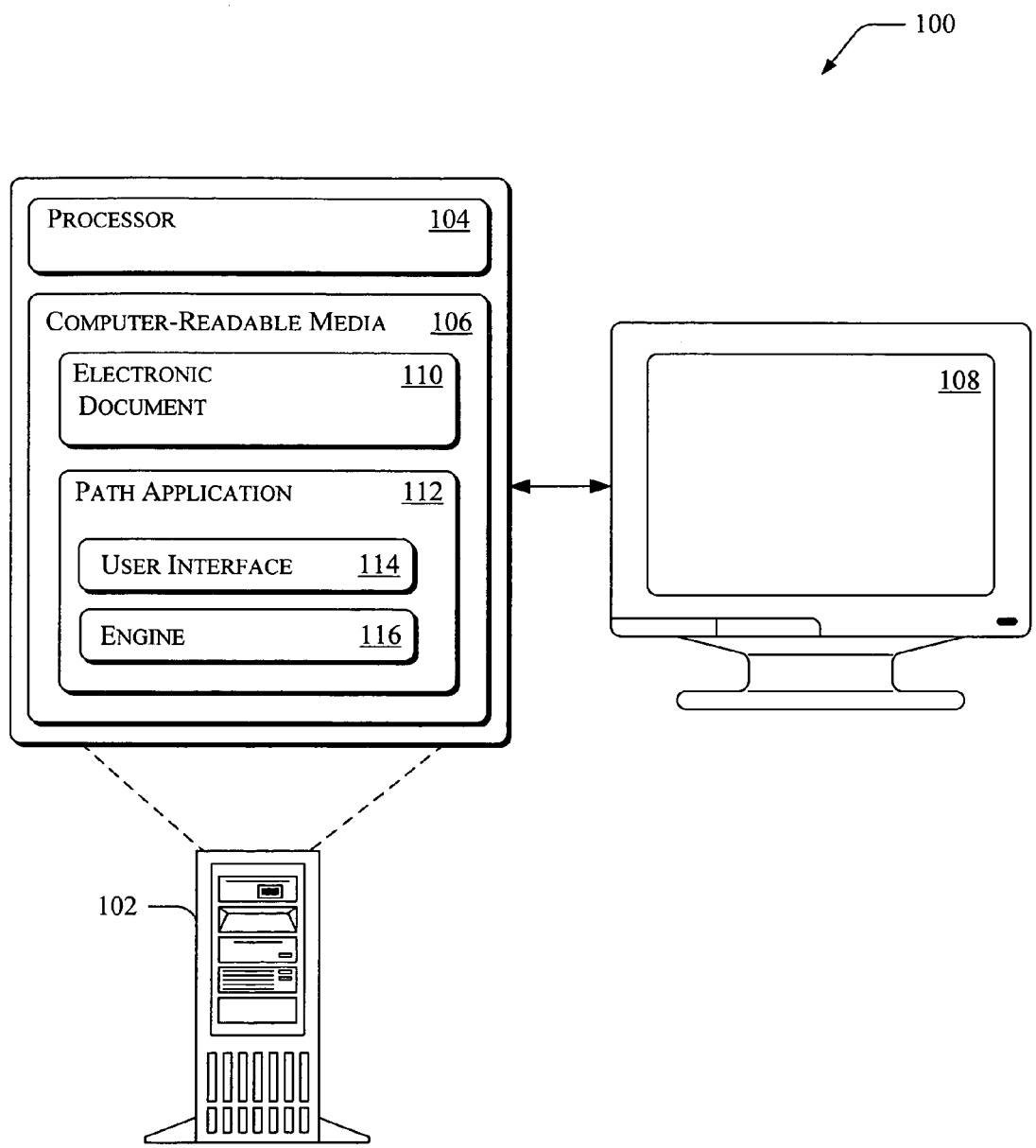
FIG. 1 illustrates an exemplary architecture having an exemplary electronic document and path application.

Referring to FIG. 1, an exemplary architecture 100 is shown comprising a computing device 102 having a processor 104 and computer-readable media 106 in communication with a display 108. The processor is capable of accessing and/or executing the computer-readable media. The computer-readable media comprises a hierarchically structured electronic document 110 and a path application 112 having a user interface 114 and an engine 116. The path application is shown comprising the user interface and the engine, though each of these can be separate and operate separately.

The path application is capable of generating and/or modifying structured-document path-language addresses, functions, and expressions. The user interface is capable of presenting and receiving information to and from a user, such as through the display 108 and various user-input devices, such as a keyboard or mouse (not shown). The engine is capable of simplifying the path-language syntax, such as address and function syntax.

This architecture and its components are shown to aid in discussing the tools but are not intended to limit their applicability.

Generating Structured-Document Path-Language Expressions

Figure 2:
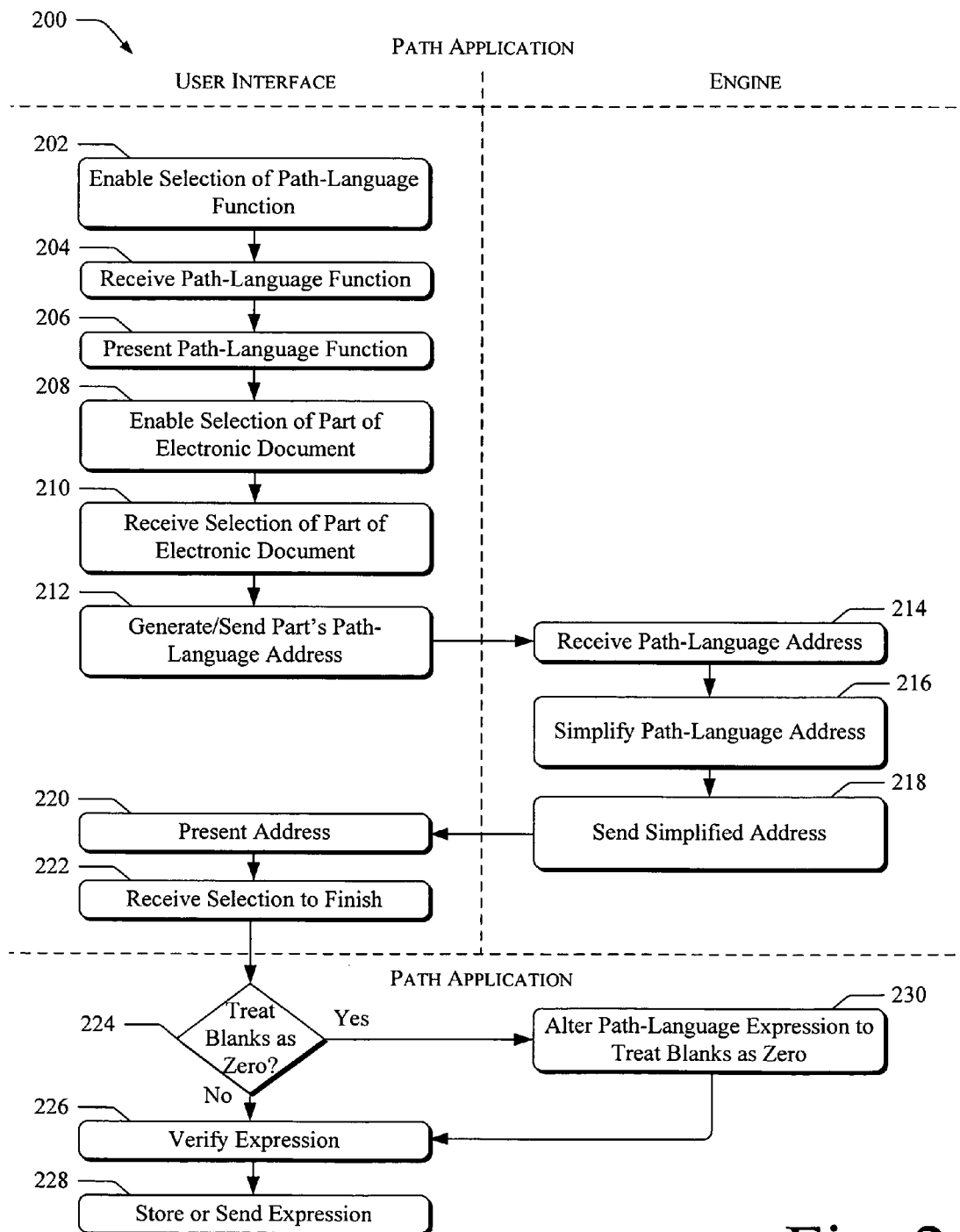
FIG. 2 sets forth a flow diagram of an exemplary process for building a structured-document path-language expression.

Referring to FIG. 2, an exemplary process 200 for building a structured-document path-language expression is shown. The process 200 is illustrated as a series of blocks representing individual operations or acts performed by path application 112, user interface 114, and/or engine 116. This process may be implemented in any suitable hardware, software, firmware, or combination thereof. In the case of software and firmware, these processes represent computer-readable media having sets of operations implemented as computer-executable instructions.

At block 202, user interface 114 enables selection of one or more structured-document path-language functions. In this embodiment, the user interface enables selection of functions first, though enabling selection of parts of an electronic document first or concurrently with selection of functions can also be performed. The user interface can provide many functions and explanations about what operations each function can perform. It can also enable users to select a function without having to type in the syntax for that function.

Figure 3:
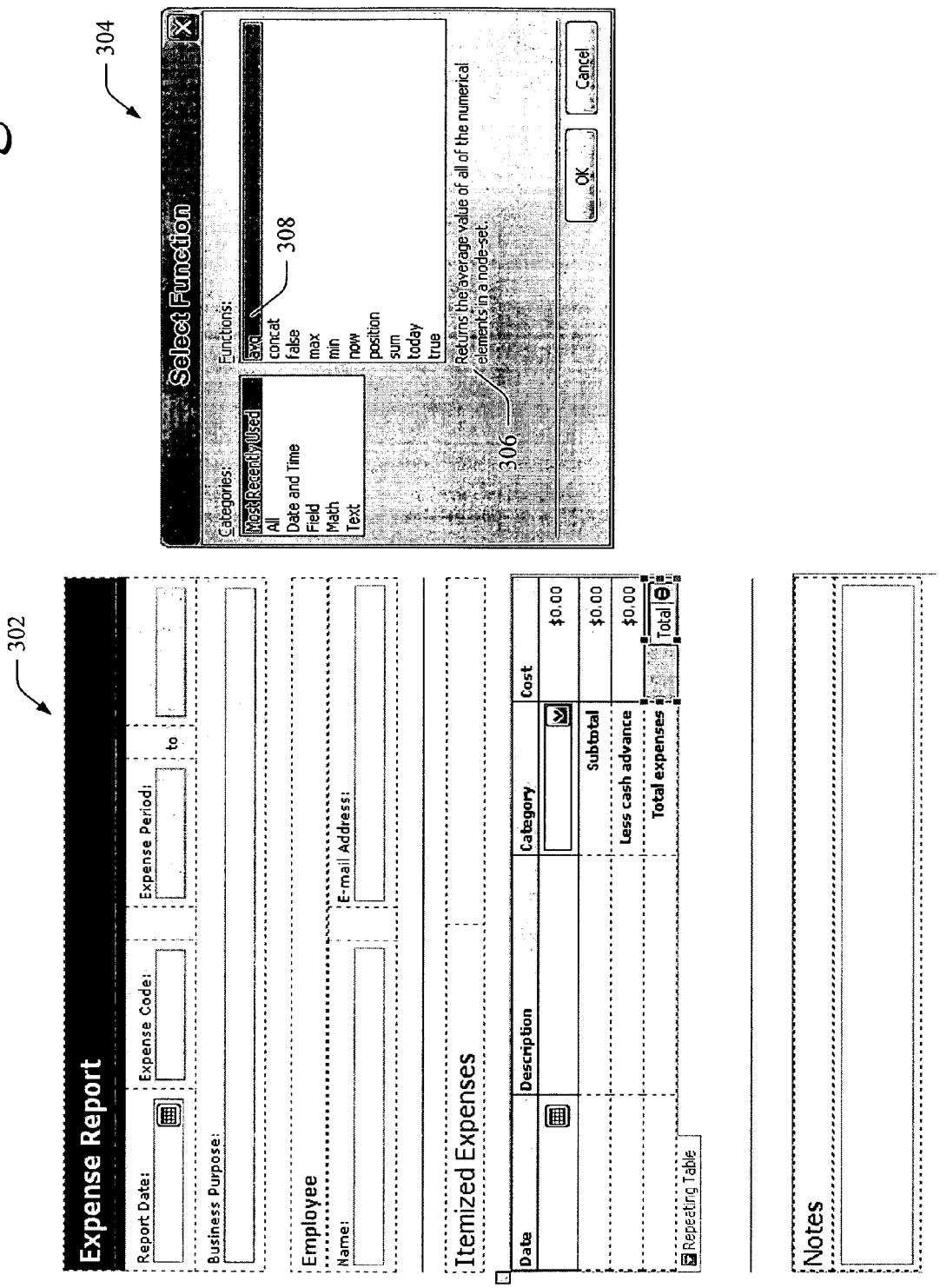
FIG. 3 illustrates an exemplary electronic form and an exemplary function selection window.

As an example, consider FIG. 3. There, an electronic form 302, which is a hypertext-machine-language (HTML) rendering of electronic document 110, and a function selection window 304 are shown. This electronic form shows one type of electronic form that may be used, though other types of forms enabling electronic entry of information can also be used. In the illustrated embodiment, the electronic document is a hierarchically structured document written in XML (eXtensible Markup Language) and the functions provided are useable with XML Path Language (XPath). Other path languages useable with electronic documents having a structure may also be used.

The electronic form, entitled "Expense Report", provides one way in which to view and select parts of electronic document 110. Selecting parts of the electronic document through the electronic form is discussed below.

Function selection window 304 provides a graphical user interface enabling a user to quickly and easily select an XPath function. In this illustration, the function selection window shows a few of many possible functions that can be selected, in this case, functions that average ("avg"), concatenate ("concat"), return false as a Boolean ("false"), return a maximum value ("max"), return a minimum value ("min"), return the current date and time ("now"), return a position ("position"), add values and return that sum ("sum"), return the current date ("today"), and return true as a Boolean ("true").

The function selection window can present functions to a user in a syntactically incomplete or simplified form. By so doing, a user can view functions without having to know details about the syntax for that function or having to type it in. Also, the function selection window can provide information about the functions helpful to instruct the user as to which operation the functions can perform. In the illustrated embodiment, for instance, the function selection window provides explanation information 306 about the highlighted average function 308.

Returning to FIG. 2, at block 204, the user interface receives selection of a structured-document path-language function. In the ongoing example, a selection of an XPath "sum" function is received through function selection window 304. In another embodiment, a structured-document path-language function can be received in another manner, such as by being typed into another embodiment of the user interface. This is helpful in permitting a user to manually type in a function in those situations where the user is familiar and comfortable with that function.

At block 206, the user interface presents a structured-document path-language function. This structured-document path-language function can show the actual syntax of that function for the path language or can be an alteration, a simplification, and/or a symbol representing that function.

As an example, consider FIG. 4. There, a function presentation window 402 is shown. In this example, this window presents the selected "sum" function in a simplified, textual representation 404. This representation can be familiar and easy for a user to understand, which in some cases makes the textual representation of greater or lesser length than the actual syntax of that function. The function presentation window can also enable a user to select another interface for inserting fields or groups (also called "nodes" or "parts" of an electronic document), with text 406 ("double click to insert field") or selection button 408.

Returning to FIG. 2, at block 208, the user interface enables selection of one or more parts of a hierarchically structured electronic document. The user interface can enable graphical selection of parts of an electronic document through various representations of that electronic document, such as through an HTML rendering of the electronic document or through its logical structure.

Figure 5:
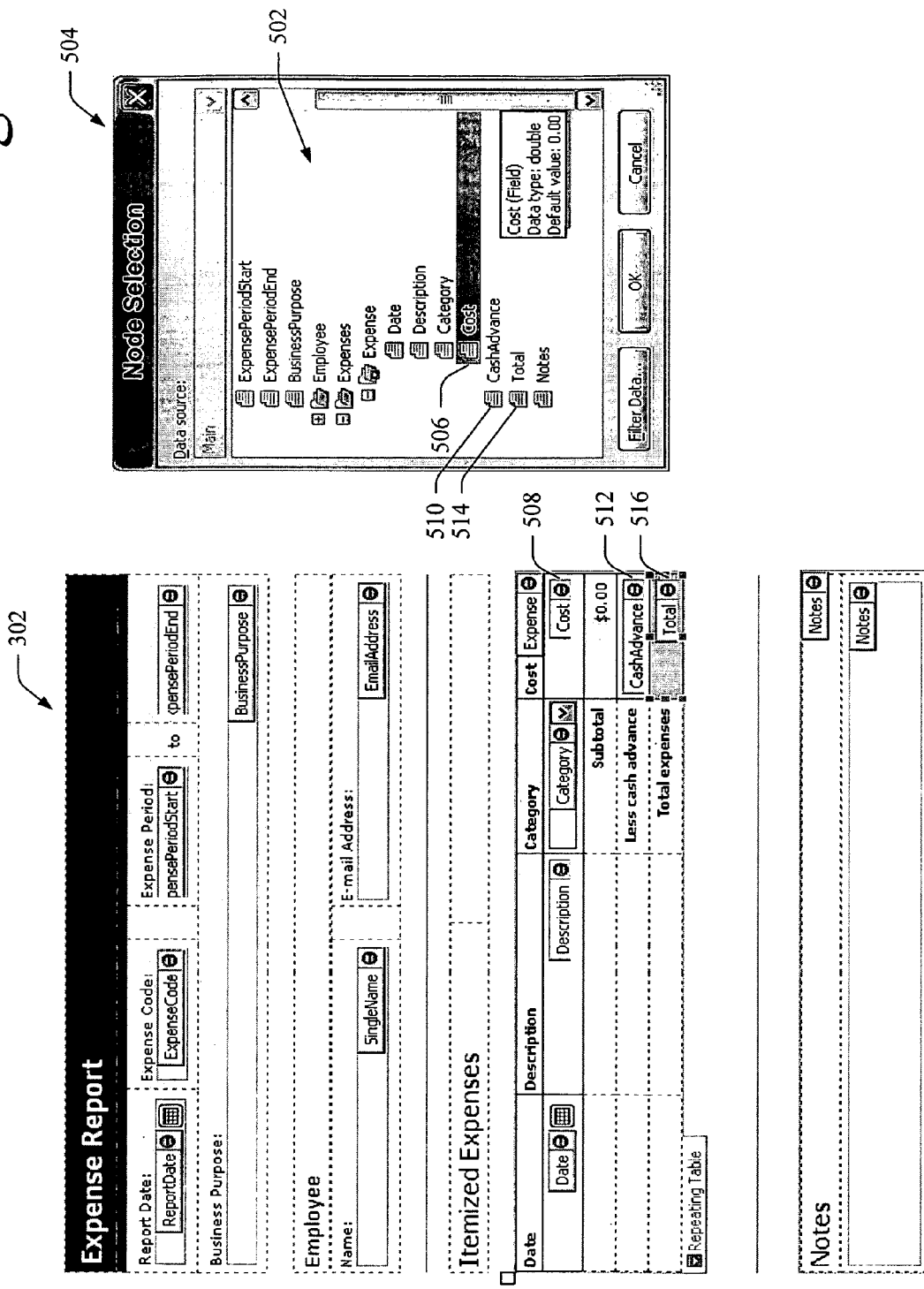
FIG. 5 illustrates two exemplary representations of an electronic document: an electronic form; and a hierarchical schema.

As an example, consider FIG. 5. There, two representations of electronic document 110 are shown: the electronic form 302; and a hierarchical schema 502 showing nodes of the electronic document. The hierarchical schema is shown as part of node-selection window 504. A user can select parts of the electronic document by selecting nodes of the hierarchical schema or fields of the electronic form. Path application 112 (FIG. 1) can determine which part of the electronic document is selected by selection of fields or nodes. In the illustrated embodiment, fields shown in the electronic form map to nodes of the hierarchical schema, allowing either to be selected.

Returning to FIG. 2, block 210, the user interface receives selection of part of a hierarchically structured electronic document. Referring again to FIG. 5, a user "cost" node selection is received. In this illustrated embodiment, the cost node is selected by the user clicking a pointer (like with a mouse) on a "cost" icon 506 of hierarchical schema 502, though other selection manners can also be used. Receipt of the same "cost" node can also be received by the user selecting cost data-entry field 508, which maps to the cost node.

At block 212, the user interface or path application 112 generates and/or sends a structured-document path-language address for a part of a hierarchically structured electronic document. By so doing, the path application can create a structured-document path-language addressing syntax for selected parts of an electronic document without a user having to understand or type in the addressing syntax.

At block 214, engine 116 receives a structured-document path-language address for a hierarchically structured electronic document. This address can be a machine-readable and complete syntax for addressing one or more parts of an electronic document. In the ongoing embodiment, the engine receives a full, XPath address for the "cost" node selected by the user at block 210. This XPath address can be textually shown as:

/NS1:ExpenseReport/NS1Expenses/NS1:Expense/NS1:cost

At block 216, the engine simplifies a structured-document path-language address. The engine can simplify the addressing syntax or otherwise enable it to be presented in a more human-understandable or readable form. In one embodiment, the engine simplifies the structured-document path-language address by abbreviating it, such as by removing all of the text from left to right of the address, until the engine encounters a non-unique namespace. If, for instance, the structured-document path-language address is A/B/C/D/E and A, B, C, and D are unique, the engine can remove A/B/C/D/ and leave just E. If, also for instance, there is one A, one B, two Cs, each having one D and one E, the engine can remove A/B/ and leave C/D/E.

In another embodiment, the engine simplifies an address to its minimally logical textual form. In the illustrated embodiment, the minimally logical form is "cost". The addressing syntax before "cost" is not needed for a user to understand which node of electronic document 110 to which "cost" refers. In other embodiments of an electronic document, however, the minimally logical form may be longer or not the last textual piece (e.g., the last namespace "NS1:cost").

For example, if electronic document 110 comprises multiple expense nodes, each having date, description, category, and cost nodes, the full XPath address could be:

/NS1ExpenseReport/NS1:Expenses/NS1:Expense[1]/NS1:cost[1]

The minimally logical form for the full address would then address the expense node as well. This form is: "Expense[1] . . . cost". The "[1]" behind after cost is not needed because there is only one cost node subordinate to the "Expense[1]" node.

Also, for example, if the electronic document further comprises multiple cost nodes for the selected expense node, the full XPath address could be:

/NS1:ExpenseReport/NS1:Expenses/NS1:Expense[1]/NS1:cost[1]

But, the minimally logical form is instead: "Expense[1] . . . cost[1]", which indicates which of multiple cost nodes is being addressed.

Other forms can also be generated by the engine, such as text that is not as abbreviated as much as the above minimally logical forms.

At block 218, the engine sends a simplified address to a user interface, such as user interface 114.

At block 220, user interface 114 presents a simplified structured-document path-language address. This address can be an easier-to-read or understand form of the actual address, such as an abbreviation of the actual address. It can also be a symbol representing the node, such as an icon representing the node being addressed. By so doing, the path application enables users who may not understand structured-document path-language addressing syntax to understand what parts of an electronic document they have selected.

Figure 6:
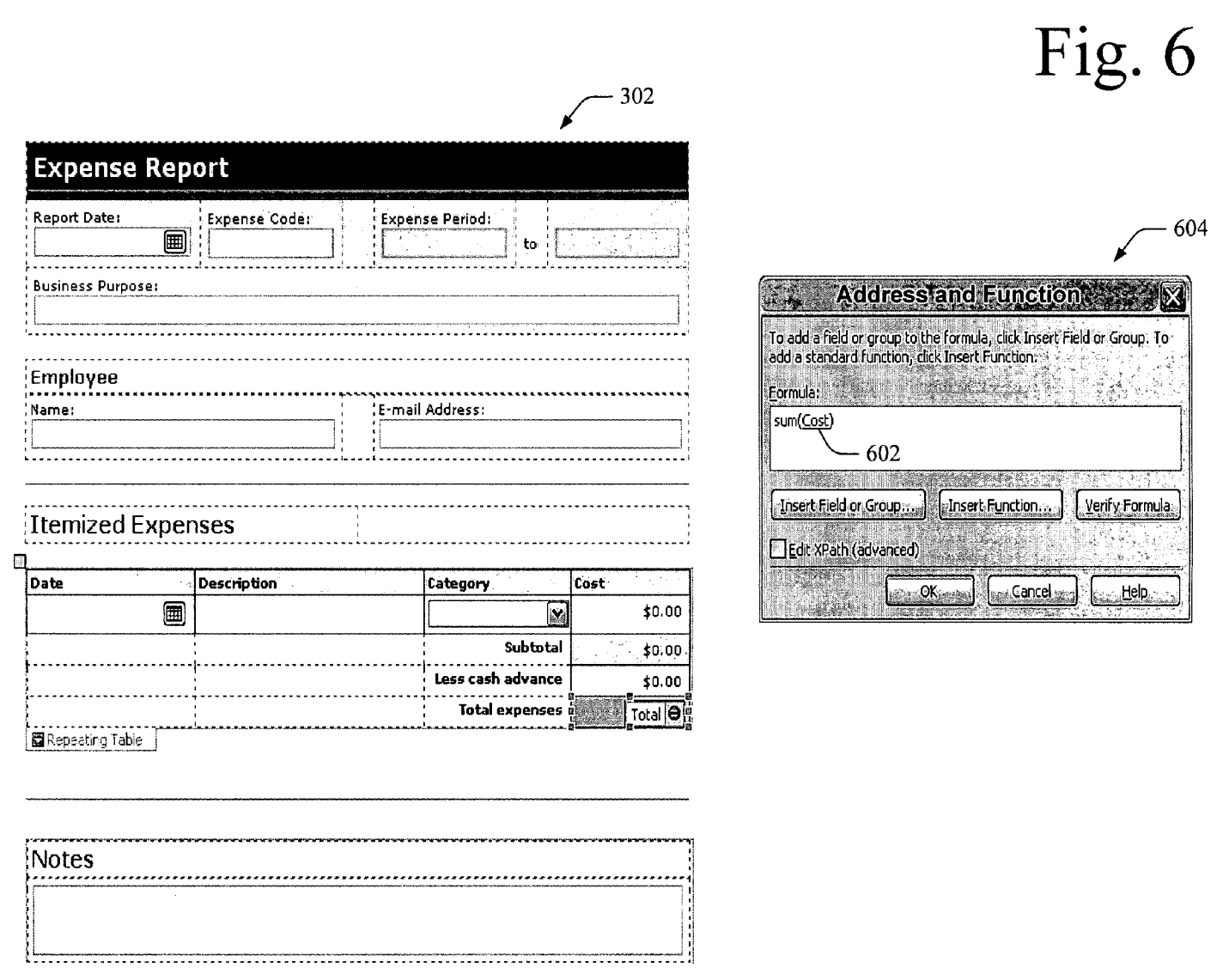

Referring to FIG. 6, the user interface presents a minimally logical form 602 of an XPath addressing syntax for the cost node of the electronic document. In this example, the user interface presents it in an address and function window The user interface presents the minimally logical form simply as: "Cost". If the address is selected after the function (as the illustrated embodiment shows), the address can be oriented correctly within the existing function. If the function is chosen after the address, the function can be oriented correctly based on the existing address or addresses.

In another embodiment, the user interface presents an icon or symbol for the address. This icon or symbol can be "Cost" icon 506 of hierarchical schema 502 or cost data-entry field 508 of electronic form 302, for instance. The icon or symbol can also be a highlight or other differentiating mark on a currently presented icon or data-entry field.

Before continuing to block 222, some or all of blocks 202 through 220 can be repeated. The path application can continue to enable a user to select functions and nodes. A user can select, for instance, a cash advance node (shown as a "cash advance" icon 510 of hierarchical schema 504 and cash advance data-entry field 512 of electronic form 302, all of which are shown in FIG. 5). At block 220, an address or indicator for the cash advance node can be presented in the address and function window of FIG. 6.

Figure 7:
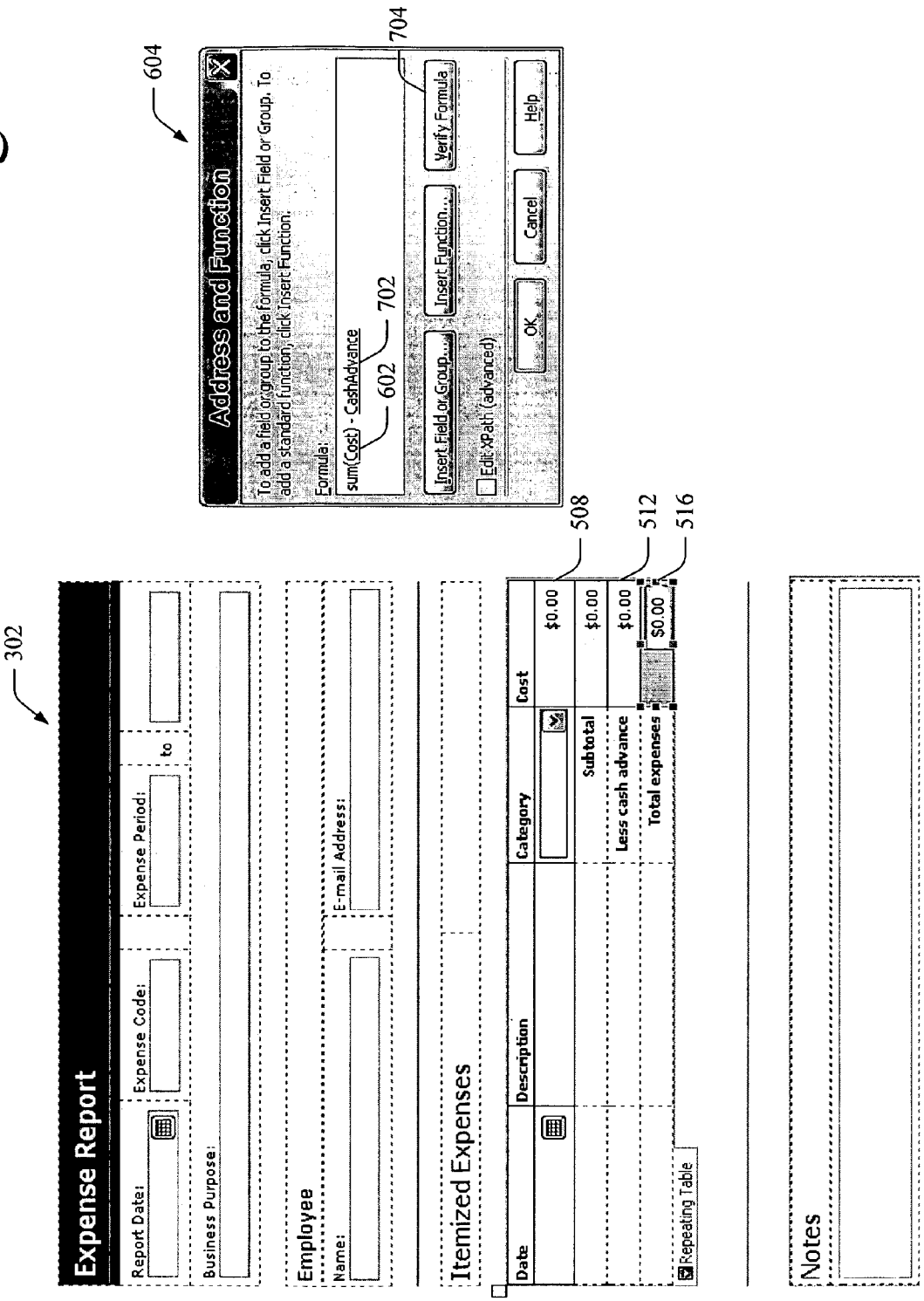
FIG. 7 illustrates the address and function window of FIG. 6 having an exemplary minimally logical form for a second XPath addressing syntax.

Referring to FIG. 7, the user interface presents a minimally logical form 702 of an XPath addressing syntax for the cash advance node of the electronic document. Here it is simply "CashAdvance". Before or after selecting the cash advance node, the user interface enables the user to choose whether or not to add or subtract the cash advance node. Here the user selects to subtract it, shown by the "−" symbol.

At block 222, the user interface receives a selection to finish the process. In the ongoing embodiment, this can comprise receiving an "enter" command or selection of a verify formula button 704.

At block 224, the path application determines whether or not to alter the structured-document path-language expression to treat blanks as zeros. If the path application determines to not alter the path-language expression, the path application proceeds to block 226. If the path application determines to alter the path-language expression, the path application proceeds to block 230. In the illustrated and described embodiment, the path application can determine whether or not to alter the path-language expression based on a default setting or a selection. The user interface can, for instance, enable and receive a selection (such as with a button or check box) indicating that a user wants to treat particular nodes as zero if blank.

At block 226, the path application verifies that the simplified structured-document path-language expression is syntactically valid. This is especially important in cases where a user has typed in a function or some other syntax. If the expression is not valid, the user interface can show the user the syntactical error, such as a period or comma being misplaced.

At block 228, the path application stores or communicates a computer-readable path-language expression. This expression can comprise the full syntax needed for a computer to execute the expression.

In the ongoing embodiment, the path application has built the following XPath expression for the function and nodes selected above:

/NS1:ExpenseReport/NS1:Expenses/NS1:Expense/NS1:Cost−

/NS1:ExpenseReport/NS1:Expenses/NS1:CashAdvance

The path application can evaluate this expression, save it, or send it to other applications or electronic documents. In the ongoing embodiment, the path application adds this expression to a "Total" node 514 of hierarchical schema 502 (shown in FIG. 5). When evaluated, total expenses field 516 can show the value of cost field 508 minus cash advance field 512, which in this case is $0.00 (shown in FIG. 7). The path application also presents the simplified form of the path-language expression in the address and function window, shown in FIG. 7 as "sum(Cost)−CashAdvance".

If, however, no numbers or strings (e.g., non-numbers) are in one or both of the cost or cash advance nodes, XPath may fail to generate a value for the total field. This is because XPath treats blanks as strings, rather than zeros, and so fails to perform functions intended to handle number values (such as mathematical functions) on nodes not having a number value.

At block 230, the path application alters the structured-document path-language expression to treat blanks as zeros. The path application can do so automatically, such as by a default setting, or without further user interaction based on a user's having previously selected that blank values be treated as zeros. The path application can do so for one particular node or multiple nodes addressed in the expression. This alteration can comprise adding a new function and accompanying syntax that performs this function when executed.

The path application can alter, for example, the path-language expression of the ongoing embodiment. In this example, if the selected nodes are to be treated as zero if blank, the path application can alter the expression resulting in:

Nz(NS1:ExpenseReport/NS1:Expenses/NS1:Expense/NS1:Cost)−

Nz(/NS1:ExpenseReport/NS1:Expenses/NS1:CashAdvance)

As shown, this alteration adds a function, shown with "Nz( )", to be preformed for the nodes "Cost" and "CashAdvance". This function dynamically replaces blank values with zero when the expression modified by the function is evaluated.

CONCLUSION

Systems and methods for building and/or simplifying structured-document path-language expressions are described above. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. One or more computer-readable media embodying computer-readable instructions which, when executed, perform acts comprising:

receiving a selection of at least part of a graphical rendering of a hierarchically structured electronic document;

receiving a structured-document path-language address usable to locate the part of the hierarchically structured electronic document;

automatically producing a simplified form of the structured-document path-language address, the simplified form of the structured-document path-language address being produced by abbreviating the structured-document path-language address by removing one or more unique namespaces; and building a structured-document path-language expression that includes the structured-document path-language address and, if the part of the hierarchically structured electronic document includes a blank value, altering the structured-document path-language expression to treat the blank value as a zero.

2. The media of claim 1, wherein producing the simplified form of the structured-document path-language address comprises simplifying the structured-document path-language address to a minimally logical form.

3. The media of claim 1, further comprising presenting, in a user interface, the simplified form of the structured-document path-language address.

4. The media of claim 1, wherein the structured-document path-language address comprises XML Path language (XPath).

5. The media of claim 1, wherein the electronic document comprises eXtensible Markup Language (XML).

6. A method comprising:

enabling selection of a structured-document path-language function;

receiving selection of the structured-document path-language function;

enabling graphical selection of part of a graphical rendering of a hierarchically structured electronic document;

receiving selection of the part;

automatically presenting a simplified structured-document path-language expression comprising the selected part and the selected function, the automatically presenting comprising abbreviating the structured-document path-language expression by removing one or more unique namespaces; and altering the structured-document path-language expression to treat a blank value as a zero if the selected part includes one or more blank values.

7. The method of claim 6, wherein the act of enabling selection of the structured-document path-language function comprises enabling selection through a user interface not requiring entry of a syntax for the structured-document path-language function.

8. The method of claim 6, wherein the act of enabling selection of the structured-document path-language function comprises presenting the structured-document path-language function in a syntactically incomplete form.

9. The method of claim 6, wherein the act of enabling selection of the structured-document path-language function comprises presenting the structured-document path-language function in a simplified form.

10. The method of claim 6, further comprising presenting an explanation of the structured-document path-language function.

11. The method of claim 6, wherein the structured-document path-language function comprises a function of eXtensible Markup Language (XML) Path language (XPath).

12. The method of claim 6, wherein the act of enabling graphical selection of the part comprises presenting a graphical rendering of the electronic document having a selectable field mapped to the part.

13. The method of claim 6, wherein the act of enabling graphical selection of the part comprises presenting a hierarchical schema of the electronic document having a selectable node representing the part.

14. The method of claim 6, wherein the act of presenting comprises presenting the selected part in a simplified form.

15. The method of claim 6, wherein the act of presenting comprises presenting the selected function in a simplified form.

16. The method of claim 6, wherein the act of presenting comprises presenting the selected function and the selected part in simplified forms.

17. The method of claim 6, wherein the hierarchically structured electronic document comprises eXtensible Markup Language (XML).

18. The method of claim 6, further comprising building a syntactically correct form of the structured-document path-language expression.

19. The method of claim 6, further comprising simplifying the structured-document path-language expression.

20. A method comprising:
presenting, via a user interface, a selectable simplified form of a structured-document path-language function;
presenting, via a user interface, a graphical rendering of a hierarchically structured electronic document, the graphical rendering comprising a plurality of selectable parts;
receiving selection of the simplified form;
receiving a selection of one or more of the selectable parts;
automatically producing a simplified form of a structured-document path-language address for at least one selected selectable part the simplified form of the structured-document path-language address being produced by removing one or more unique namespaces;
building a structured-document path-language expression comprising the structured-document path-language function and the structured-document path-language address, and
altering the structured-document path-language expression to treat a blank value as a zero if the selected part includes one or more blank values.

21. The method of claim 20, wherein the simplified form describes an operation of the structured-document path-language function.

22. The method of claim 20, wherein the simplified form comprises a textual string of greater length than a machine-readable syntax for the structured-document path-language function.

23. The method of claim 20, further comprising presenting an explanation of the structured-document path-language function.

24. The method of claim 20, wherein the structured-document path-language function is a function of eXtensible Markup Language (XML) Path language (XPath).

25. A method comprising:
presenting a graphical rendering of a hierarchically structured electronic document;
receiving selection of a part of the graphical rendering, the selected part corresponding to a node on a hierarchical schema for the hierarchically structured electronic document, the hierarchical schema comprising a plurality of nodes;
generating a structured-document path-language addressing syntax for the node;
automatically simplifying the structured-document path-language addressing syntax by abbreviating the structured-document path-language address by removing one or more unique name spaces;
presenting the simplified structured-document path-language syntax; and
building a structured-document path-language expression comprising the structured-document path-language addressing syntax and a syntax for a structured-document path-language function, the building being effective to enable the structured-document path-language expression to treat a blank value of the selected node as a zero.

26. The method of claim 25, wherein the act of simplifying comprises simplifying the structured-document path-language addressing syntax to a minimally logical form.

27. The method of claim 25, wherein the act of presenting the graphical rendering of the hierarchically structured electronic document comprises presenting the hierarchical schema for the electronic document having selectable icons by which one or more of the plurality of nodes are able to be selected.

28. The method of claim 25, wherein the act of presenting the graphical rendering of the hierarchically structured electronic document comprises presenting a rendering of the electronic document having selectable fields by which one or more of the plurality of nodes are able to be selected.

29. The method of claim 25, further comprising:
receiving syntax for a structured-document path-language function; and
building a structured-document path-language expression comprising the structured-document path-language addressing syntax and the syntax for the structured-document path-language function.

30. The method of claim 29, further comprising determining if the structured-document path-language expression is syntactically correct.

31. The method of claim 29, further comprising presenting information showing a syntactical error in the structured-document path-language expression if the structured-document path-language expression is syntactically incorrect.

32. The method of claim 25, wherein the structured-document path-language comprises XML Path language (XPath).

33. A method comprising:
receiving a structured-document path-language expression addressing a node of a hierarchically structured electronic document, the node corresponding to a user selection of a graphical rendering of a part of the hierarchically structured electronic document, and the node being associated with a simplified structured-document path-language address automatically produced by removing one or more unique name spaces; and altering the structured-document path-language expression effective to enable the structured-document path-language expression to treat a blank value of the node as a zero.

34. The method of claim 33, wherein the act of altering is performed without user interaction.

35. The method of claim 33, wherein the structured-document path-language expression comprises a mathematical function and wherein the act of altering is effective to enable the structured-document path-language expression to produce a numerical result when evaluated.

36. The method of claim 33, wherein the structured-document path-language expression comprises XML Path Language (XPath) and the hierarchically structured electronic document comprises XML.

* * * * *